United States Patent
Lewis

(10) Patent No.: US 8,671,143 B2
(45) Date of Patent: Mar. 11, 2014

(54) VIRTUAL BADGE, DEVICE AND METHOD

(71) Applicant: Pathfinders International, LLC, West Palm Beach, FL (US)

(72) Inventor: Scott Lewis, West Palm Beach, FL (US)

(73) Assignee: Pathfinders International, LLC, West Palm Beach, FL (US)

( * ) Notice: Subject to any disclaimer, the term of this patent is extended or adjusted under 35 U.S.C. 154(b) by 0 days.

(21) Appl. No.: 13/757,320

(22) Filed: Feb. 1, 2013

(65) Prior Publication Data

US 2013/0218931 A1 Aug. 22, 2013

Related U.S. Application Data

(63) Continuation-in-part of application No. 13/661,555, filed on Oct. 26, 2012, which is a continuation-in-part of application No. 13/536,618, filed on Jun. 28, 2012, which is a continuation-in-part of application No. 13/524,724, filed on Jun. 15, 2012, which is a continuation-in-part of application No. 13/296,874, filed on Nov. 15, 2011, which is a continuation-in-part of application No. 12/410,003, filed on Mar. 24, 2009, now Pat. No. 8,154,440, which is a continuation-in-part of application No. 11/696,532, filed on Apr. 4, 2007, now abandoned.

(60) Provisional application No. 61/709,844, filed on Oct. 4, 2012.

(51) Int. Cl.
  *G06F 15/16* (2006.01)
(52) U.S. Cl.
  USPC ............ 709/204; 709/217; 713/175; 235/382
(58) Field of Classification Search
  USPC ....... 235/380, 382; 726/30; 707/732; 705/67; 455/411; 713/168, 175; 709/204, 217
  See application file for complete search history.

(56) References Cited

U.S. PATENT DOCUMENTS

| | | | |
|---|---|---|---|
| 5,592,408 | A | 1/1997 | Keskin et al. |
| 5,619,412 | A | 4/1997 | Hapka |
| 6,058,304 | A | 5/2000 | Callaghan et al. |
| 6,268,798 | B1 | 7/2001 | Dymek et al. |
| 6,292,724 | B1 | 9/2001 | Apsell et al. |

(Continued)

OTHER PUBLICATIONS

Anonymous, "SB1 smart badge", Motorola solutions product preview sheet, pp. 1-2, (Jun. 2012).

(Continued)

*Primary Examiner* — Jungwon Chang
(74) *Attorney, Agent, or Firm* — McHale & Slavin, P.A.

(57) ABSTRACT

A system, method, and device comprising a virtual badge are disclosed. A virtual badge can be displayed on a cell phone or in another linked portable device, and for security purposes, has images which can be scanned, and the capability to alternate colors and/or self-destruct on a pre-set schedule. Whether for after a disaster or for daily use, the system uses cell phones or mobile devices loaded with specialized software. Using plugin technologies, the system optionally can enable field collected photos and notes on customizable forms to be mapped, tracked, and time/date stamped—including in a 100% disconnected environment. A modifiable virtual badge can aid in inventory, accountability, organization, and efficiency. The system can be employed by the "Whole Community"—citizens, businesses, not-for-profits, and government agencies—for social media, business, cleanup, insurance adjusters, or personnel focused on day to day operations or on mitigation, preparedness, response, and recovery.

19 Claims, 27 Drawing Sheets

(56) References Cited

U.S. PATENT DOCUMENTS

| | | |
|---|---|---|
| 6,315,198 B1 | 11/2001 | Lenglart et al. |
| 6,394,356 B1 | 5/2002 | Zagami |
| 6,574,561 B2 | 6/2003 | Alexander et al. |
| 6,842,774 B1 | 1/2005 | Piccioni |
| 6,868,340 B2 | 3/2005 | Alexander et al. |
| 6,999,876 B2 | 2/2006 | Lambert et al. |
| 7,142,900 B1 | 11/2006 | Straub |
| 7,207,480 B1 * | 4/2007 | Geddes ..................... 235/380 |
| 7,631,805 B2 | 12/2009 | Larson et al. |
| 7,760,905 B2 | 7/2010 | Rhodes et al. |
| 7,778,802 B2 | 8/2010 | O'Flaherty et al. |
| 7,808,378 B2 | 10/2010 | Hayden |
| 7,822,816 B2 | 10/2010 | Payne |
| 8,045,954 B2 | 10/2011 | Barbeau et al. |
| 8,073,461 B2 | 12/2011 | Altman et al. |
| 8,145,183 B2 | 3/2012 | Barbeau et al. |
| 8,154,440 B2 | 4/2012 | Lewis |
| 8,174,931 B2 | 5/2012 | Vartanian et al. |
| 2003/0080897 A1 | 5/2003 | Tranchina et al. |
| 2004/0010472 A1 * | 1/2004 | Hilby et al. ..................... 705/67 |
| 2006/0168185 A1 | 7/2006 | McCall et al. |
| 2007/0106892 A1 * | 5/2007 | Engberg ..................... 713/168 |
| 2010/0076968 A1 * | 3/2010 | Boyns et al. ..................... 707/732 |
| 2012/0090038 A1 * | 4/2012 | Pacella et al. ..................... 726/30 |
| 2012/0270521 A1 * | 10/2012 | Lopez Garcia et al. ....... 455/411 |

OTHER PUBLICATIONS

Van Grove, J., "Turn your phone into an 'Hello my name is' badge", Internet article, URL:http://mashable.com/2011/03/09/contxts-interactive-badge, (Mar. 9, 2011) retrieved Jan. 29, 2013.

Schaffhauser, D., "Student-invented mobile app could replace security access badges", Internet article: URLhttp//campustechnology.com/articles/2012/02/13/Student-invented-mobile-app-could-replace-security-access-badges.aspx, Campus Technology, (Feb. 13, 2012) retrieved Jan. 29, 2013.

* cited by examiner

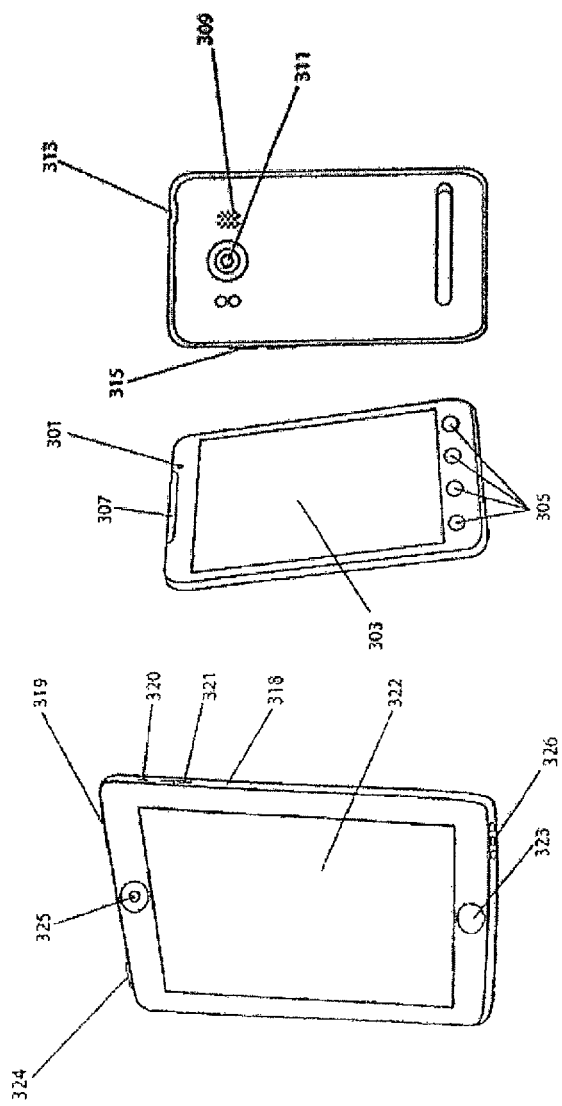

Fig 16

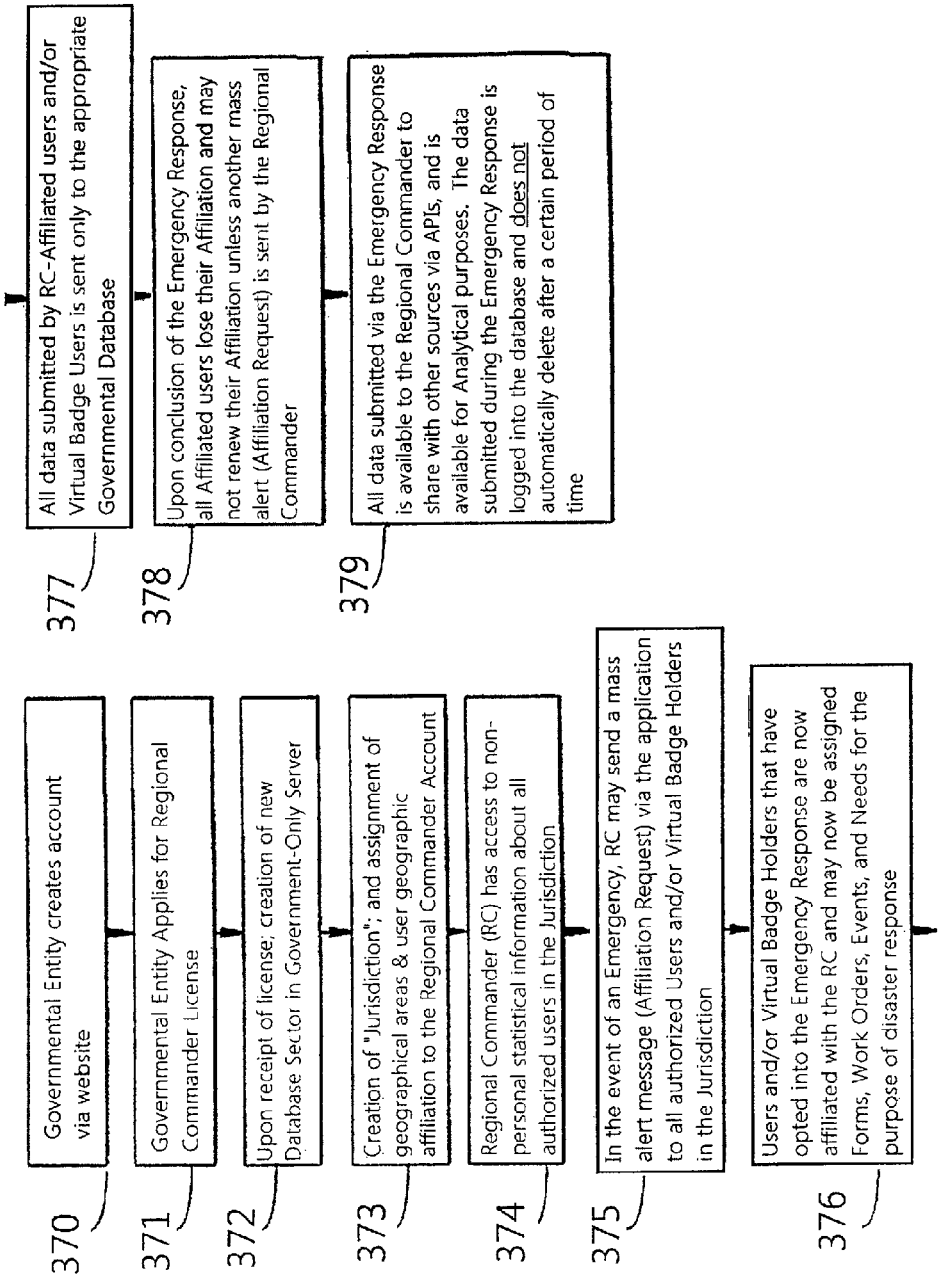

370 — Governmental Entity creates account via website

371 — Governmental Entity Applies for Regional Commander License

372 — Upon receipt of license; creation of new Database Sector in Government-Only Server 373 — Creation of "Jurisdiction"; and assignment of geographical areas & user geographic affiliation to the Regional Commander Account 374 — Regional Commander (RC) has access to non-personal statistical information about all authorized users in the Jurisdiction 375 — In the event of an Emergency, RC may send a mass alert message (Affiliation Request) via the application to all authorized Users and/or Virtual Badge Holders in the Jurisdiction 376 — Users and/or Virtual Badge Holders that have opted into the Emergency Response are now affiliated with the RC and may now be assigned Forms, Work Orders, Events, and Needs for the purpose of disaster response 377 — All data submitted by RC-Affiliated users and/or Virtual Badge Users is sent only to the appropriate Governmental Database 378 — Upon conclusion of the Emergency Response, all Affiliated users lose their Affiliation and may not renew their Affiliation unless another mass alert (Affiliation Request) is sent by the Regional Commander 379 — All data submitted via the Emergency Response is available to the Regional Commander to share with other sources via APIs, and is available for Analytical purposes. The data submitted during the Emergency Response is logged into the database and does not automatically delete after a certain period of time

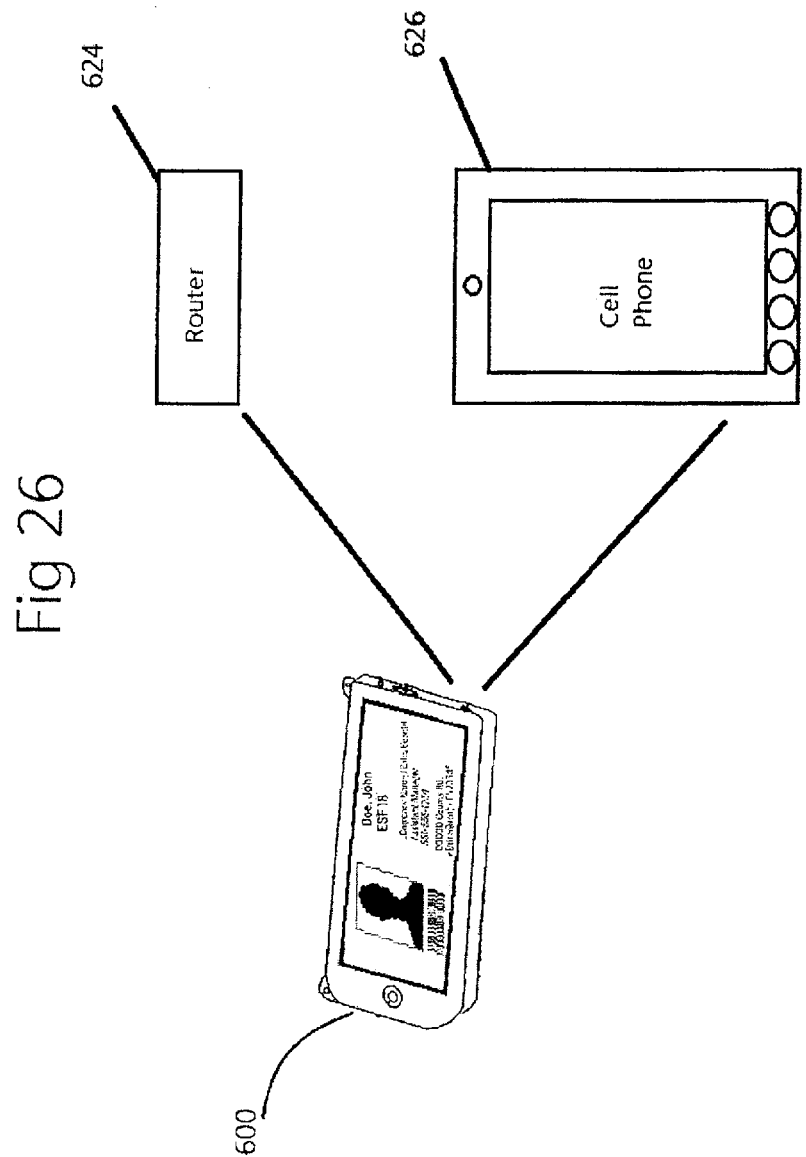

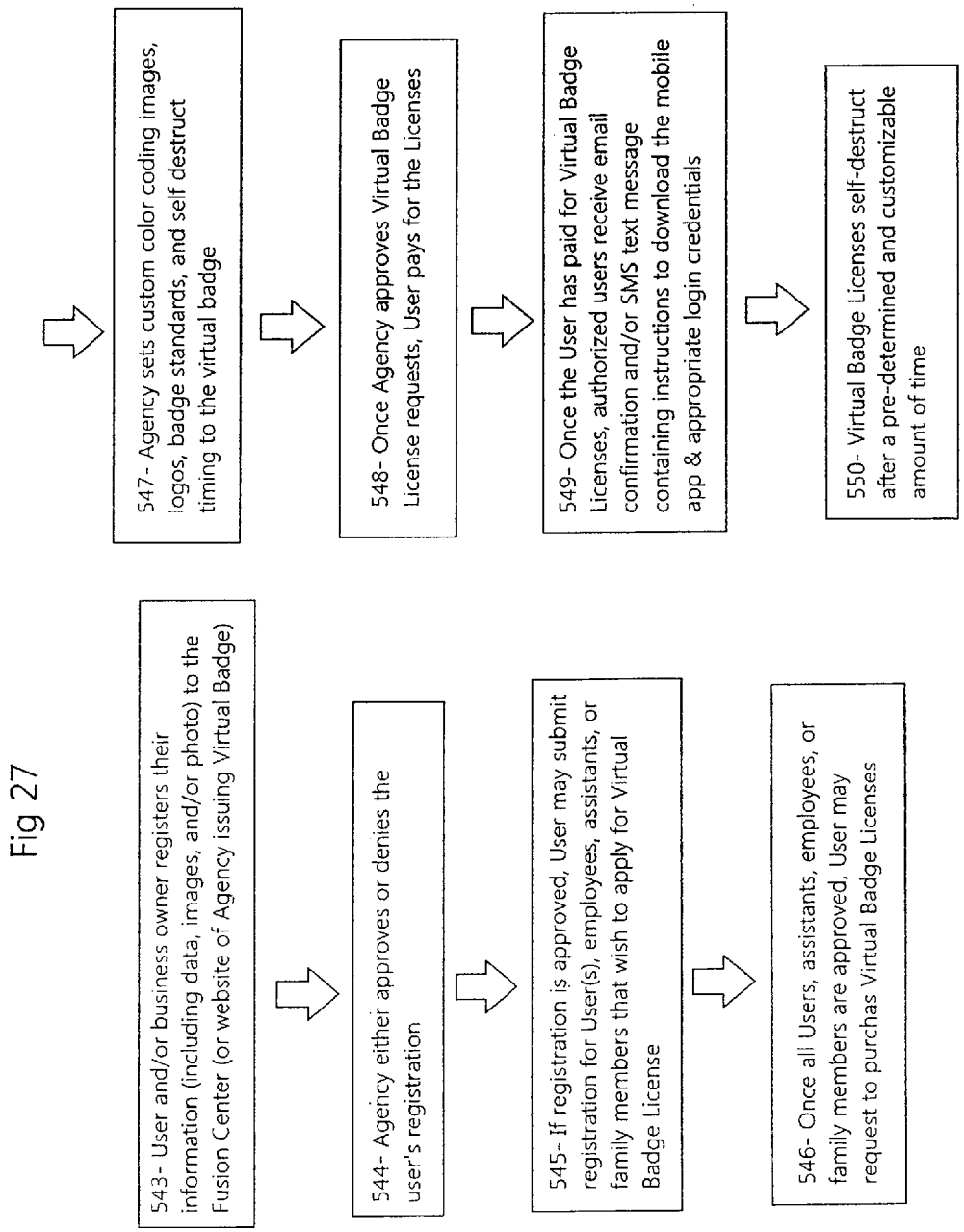

VIRTUAL BADGE, DEVICE AND METHOD

REFERENCE TO RELATED APPLICATIONS

In accordance with 37 C.F.R 1.76, a claim of priority is included in an Application Data Sheet filed concurrently herewith. Accordingly, under 35 U.S.C. §119(e), 120, 121, and/or 365(c) the present invention claims priority as a continuation-in-part to U.S. patent application Ser. No. 13/661,555, filed on Oct. 26, 2012, entitled, "VIRTUAL BADGE, DEVICE AND METHOD", which claims priority to U.S. Provisional Patent Application No. 61/709,844, filed on Oct. 4, 2012; entitled, "VIRTUAL BADGE, DEVICE AND METHOD", and is a continuation-in-part of U.S. patent application Ser. No. 13/536,618, filed Jun. 28, 2012, entitled, "GPS PATHFINDER CELL PHONE AND METHOD", which is a continuation-in-part of U.S. patent application Ser. No. 13/524,724, filed Jun. 15, 2012, entitled, "GPS PATHFINDER CELL PHONE AND METHOD", which is a continuation-in-part of application U.S. patent application Ser. No. 13/296,874, filed Nov. 15, 2011, entitled, "GPS PATHFINDER CELL PHONE AND METHOD", which is a continuation-in-part of application U.S. patent application Ser. No. 12/410,003, filed Mar. 24, 2009, entitled "GPS PATHFINDER CELL PHONE AND METHOD", now U.S. Pat. No. 8,154,440, which is a continuation-in-part of application U.S. patent application Ser. No. 11/696,532, filed Apr. 4, 2007, entitled "GPS PATHFINDER METHOD AND DEVICE" and now abandoned. The contents of each of the above referenced applications or patents are herein incorporated by reference in its entirety.

FIELD OF THE INVENTION

The present invention relates to electronic identification for daily use as well as for disaster response and recovery systems which incorporates a variety of approaches to daily and pre and post disaster operations; and more particularly to a system, method and device which provide for a virtual badge on an electronic device, such as a mobile device as well as a separate, synched, cost effective, electronic display device.

BACKGROUND OF THE INVENTION

The present invention is a continuation in part of U.S. Pat. No. 8,154,440 and related applications as described above, the contents of each are incorporated by reference in its entirety. The '440 patent describes a mobile software system for a variety of operations before, during, and after a disaster. The '440 patent further disclosed systems that provided a mechanism which can be used in a variety of emergency management operations. One area not addressed was the need for rapid, massive registration and badge identification of large numbers of personnel, especially following a disaster. Responders, residents, and business owners, plus their employees, all need access to restricted areas. The National Response Framework even mandates such badging, yet no viable, fast, simple, inexpensive, and high capacity system is available. Up until now, plastic badges or temporary paper badges have been the norm. The cost of badge supplies, printers, labor, on site power, and wasted time preparing such items in the chaotic times following a disaster are replaced and/or augmented by the present systems, methods, and device. With this new "virtual" badging system described herein, having web based registration from areas remote from the restricted area, the present invention provides more rapid and efficient, mass implementation of identification mechanisms.

The electronic identification system includes a virtual badge on a mobile device as well as an additional method of using a separate, synched, cost effective, electronic display device. The present invention is adapted to be used in normal, day-to-day operations. The system therefore, is designed to be easily implemented so that users will be familiar with the system, thereby eliminating the requirement of responders and citizens attempting to learn a new system in the chaos immediately following a disaster. This guidance of focusing on Whole Community response programs to integrate such systems into normal day to day use follows protocols of the Department of Homeland Security (DHS). The present invention is further adapted to be usable in a 100% disconnected environment when all interne and cell infrastructure is not functioning.

The present invention further describes a system of workflow management designed to be used to badge and then to monitor and track mobile workers. By providing administrators with the ability to send alerts and tasks to their badge users, as well as allowing users to send notes, forms, and events to each other, the virtual badge system in accordance with the present invention can be used to efficiently manage personnel. While the present invention finds use in the disaster arena, other non-emergency applications are contemplated and described herein. The present invention includes a cellular phone or a linked device equipped with mobile software, a Global Positioning System (GPS) receiver, GPS functions, and BLUETOOTH® (or other evolving technologies like Near Field Communications, herein referenced as NFC), comprising a system designed to also work when cellular towers are damaged or destroyed.

The '440 patent was first designed for use with feature phones, known by some now as "dumb phones." The recent developments in mobile technology have resulted in touchpad based and GPS capable cell phone computers known as "smart phones" and "tablets", which have advanced computing abilities. These devices allow for much simpler software application integration with the device hardware which constantly is being updated with new inventions, such as the Radio Frequency Identification (RFID) chips, the Near Field Communication (NFC) chip, the GPS receiver, or the BLUETOOTH® chip. These upgrades to mobile devices allow for much easier customization of software applications to be cross-platform and be compatible with a multitude of devices from a multitude of cellular carriers. The present invention is adapted to merge the dumb phones with smart phones into a system designed to not only work on both types of phones, but also allowing for computers and smart phones to map and track mixed teams of dumb and/or smart phone users. Accordingly, this virtual badge system is designed to work regardless of the condition of the local power, cell, and Internet infrastructure—a needed requirement in the disaster field.

DESCRIPTION OF THE PRIOR ART

U.S. Pat. No. 8,073,461 is described as disclosing a location sharing network manager process. The process is executed on a server computer coupled to a plurality of mobile communication devices over a wireless network. Each mobile device is a location-aware mobile communication device. The process determines the geographic location of a mobile communication device operated by a user within an area, displays a map representation of the area around the mobile communication device on a graphical user interface of the mobile communication device, and superimposes on the map the respective locations of one or more other trusted users of mobile communication devices coupled to the mobile communication device over the network. A journal creation and management component provides tools for users to create and store user-generated content in the form of an online journal. This user-generated content can be automatically tagged with location information provided by the location-aware mobile communication device. Such geo-tagged journal information can be shared with specific users in the network or utilized by users with specific interest in the location dimension of the journal content. The user-generated content can be provided in the form of text or graphic messages, pictures, audio/video clips, and the like.

U.S. Publication No. 2010/0076968 is described as disclosing implementations that relate to systems and methods for aggregating and presenting data related to geographic locations. Geotag data related to geographic locations and associated features or attributes can be collected to build a regional profile characterizing a set of locations within the region. Geotag data related to the constituent locations, such as user ratings or popularity ranks for restaurants, shops, parks, or other features, sites or attractions can be combined to generate a profile of characteristics of locations in the region. The platform can generate recommendations of locations to transmit to the user of a mobile device, based for instance on the location of the device in the region as reported by GPS or other location service and the regional profile. Geotag data can include audio data analyzed using region-specific terms, and user recommendations can be presented via dynamic menus based on regional profiles, user preferences or other criteria.

U.S. Pat. No. 8,174,931 is described as disclosing an apparatus and method for providing indoor location, position, or tracking of a mobile computer using building information. The mobile computer determines the dimensions of a room in a building using a range finder in the mobile computer. The determined dimensions of the room are compared to the building information to locate, position, or track the mobile computer in the building.

U.S. Pat. No. 7,778,802 is described as disclosing a system that utilizes wireless devices as guard tour checkpoint data collection and checkpoint data communication devices. The wireless devices have the capability of reading various types of checkpoints and communicating the collected checkpoint data with a computer via a cellular telephone communication system and either a land-based telephone network, the Internet or a cellular data communication device. Alternatively, a Wi-Fi network or the Wi-Fi network and the Internet can be used to communicate collected checkpoint data with the computer. The computer stores and processes the data according to guard tour expected performance parameters, such as rules, schedules, and exceptions, and then generates the necessary commands to produce exception notifications and reports at various types of peripheral equipment.

U.S. Pat. No. 7,142,900 is described as disclosing a prior art device which combines a handheld GPS receiver and a radio. The unit includes a GPS receiver and a radio transceiver. The GPS receiver operates in conjunction with cartographic data which is downloadable from cartridges. This enables the user to download a map of the immediate vicinity and determine their current location with respect thereto. The radio is a two-way radio which operates on the Family Radio Services (FRS) portion of the Citizens Band Radio Services. The broadcast range of these radios is generally two miles or less and they are commonly used by family and friends to keep in touch with each other in areas such as amusement parks and other recreational areas. The unit also has GMRS capability. This unit also has a "polling" function. This function is performed when a pushbutton or other device is activated to transmit a radio request to the other GPS/radio units to indicate their locations. The other units will automatically transmit their locations to the unit that had made the request. These locations can then be displayed on the requesting unit's display and the user can readily determine the locations of the other members of their party. While this unit can download a given day's track to a base unit, it does not have BLUETOOTH® technology and therefore must be hard wired to the base unit to store its track. Further, the use of the unit is far too complicated for the common user without prior instructions. In addition, the user cannot associate a written description or code with a specific waypoint in the unit.

U.S. Pat. No. 6,268,798 is described as disclosing a locator system for firefighters which incorporates a GPS receiver and a memory. The firefighter activates the locator unit as he enters a building and the unit records his path through the building. Should he become disoriented or injured he can activate the memory in the unit and the unit will provide a reverse indication of the path that was traversed up to that point. By following these reverse directions, the firefighter is able to safely exit the building. The unit can also communicate with a home base and transmit the path traversed by the firefighter to the home base so it can be uploaded to another unit. This second unit is employed by a rescuer into the building and by retracing the path the lost or injured firefighter is located. While these units can download a path traversed by a user, they are not equipped to be uploaded with a path to follow or an area to search. Further, they cannot associate a specific written condition or code with a waypoint.

U.S. Pat. No. 5,619,412 is described as disclosing a remotely accessible engine on a vehicle. Control of the engine can be performed on the vehicle, by the vehicle operator, or from a remote location via satellite communications.

U.S. Pat. No. 6,292,724 is described as disclosing discloses a system for monitoring the location, status, utilization and conditions of a widely geographically dispersed fleet of vehicles utilizing satellite positioning and communications and the Internet. The data obtained from the vehicles can be displayed at numerous locations.

U.S. Published Patent Application No. 2003/0080897 is described as disclosing a combination GPS receiver and radio. The GPS receiver operates in conjunction with a memory to enable a user to retrace the path they had just traversed. This feature enables a user to return to their starting point without getting lost. The radio operates on the General Mobile Radio Service (GMRS) or Family Radio Service (FRS) portion of the Citizens Band Radio channels. The broadcast range of these radios is generally two miles or less. While these units can download a path traversed by a user, they are not equipped to be uploaded with a specific path to follow or an area to search. In addition they cannot associate a written description or code with a specific way point.

U.S. Pat. No. 6,574,561 is described as disclosing a system for automating the gathering of field information which describes the condition of specific locations at specific times utilizing a field information recording device which has a GPSW receiver for recording and assignment of the space-time coordinates as information is gathered.

U.S. Pat. No. 6,868,340 is described as disclosing also discloses a system for automating the gathering of field information which describes the condition of specific locations at specific times utilizing a field information recording device which has a GPSW receiver for recording and assignment of the space-time coordinates as information is gathered. The information and space-time coordinates are transmitted to a management center for processing.

U.S. Pat. No. 6,999,876 is described as disclosing a system for providing centralized deployment and coordination of field assessment activities. An emergency management data processing system includes a field assessment database for storing and processing layered geospacial visual portrayal data and field surveillance attribute data.

U.S. Pat. No. 7,822,816 is described as disclosing a method and system for the management of data collected from a remote computer. The method includes creating a questionnaire, transmitting the questionnaire to a remote computer, executing the questionnaire in the remote computer to prompt a user for responses to questions of the questionnaire, transmitting the responses to a server via a network, and making the responses available on the Web. The computers utilized in this system are loosely networked, in that the network connections between the computers are not always available and when a connection is not available, data is stored at a node of the network and transmitted at the earliest time when a connection is available.

U.S. Pat. No. 5,592,408 is described as disclosing discloses an electronic identification device and includes a header piece with stored memory and terminals for interfacing with an electronic port of a reader device, with encoded data programmed into the memory. An identification card, identifying the holder, is attached to the electronic header piece and bears printed information relating to and identifying the intended holder.

U.S. Pat. No. 6,315,198 is described as disclosing discloses a key cabinet (AC1) for equipping an access control system (1) comprising a plurality of devices for reading data associated with personal identification means (EI), access control management means in particular comprising decision making means for controlling accesses and means for retaining a trace of the events occurring in this system, this cabinet (AC1) comprising means (Ci,j) adapted to receive a set of keys (CL) and means (TL) for controlling access to these receiving means. It furthermore comprises means (SC, CE1) for generating a virtual badge corresponding to any change of state, this virtual badge then being transferred to decision making means. Application in particular for equipping existing access control systems with key cabinets.

U.S. Pat. No. 7,760,905 is described as disclosing a portable wireless phone device includes a module configured to derive identification data from audio or visual content. The phone device transmits a packet of data to a remote system that includes both context or environment data, and also at least part of this derived identification data. The wireless phone device has modules configured to derive the identification data from content, by the application of watermark decoding, or identifier data stored in packets for various purposes.

U.S. Pat. No. 7,631,805 is described as disclosing discloses methods and systems for managing personnel security at physical locations. The method includes obtaining screening data from a plurality of different vendor entities and individuals associated with those vendor entities, where the screening data is obtained to screen the vendor entities and individuals to determine whether physical access to facilities of the sponsor entities should be granted. The method further includes performing background checks on the outside companies and their employees based on the screening data, where the background checks are initiated by the administrator entity using a computer-based system operated by the administrator entity.

U.S. Pat. No. 6,058,304 is described as disclosing discloses a data entry system includes a hand held data entry unit having a reading sensor for sensing commands and/or data, rewritable storage for storing information relating to selectable items, a controller (a microprocessor or other processing circuitry) and a display screen for displaying a user readable representation of the commands and/or stored information for a selected item, and a telecommunication interface for the telephonic transmission of information relating to items from the storage to a remote processing center and for the information relating to selectable items from the remote processing center to the storage. Preferably a telecommunications interface is provided in the hand held unit for cellular or other wireless telephony systems.

U.S. Pat. No. 6,394,356 is described as disclosing an access control system for monitoring human ingress and egress comprises an input means for creating a unique identifier for to be stored in a database. The unique identifier includes a digital image of the person, a digital image of the unique identifier, and alphanumeric identification data. A processing means coupled to said input means is operable to perform the steps of storing the unique identifier as a computer-readable file in the database, recording the arrival date and time of a person; creating a tracking record associated with the unique identifier. The unique identifier can be displayed on a monitor coupled to the processing means. A printer coupled to the processing means generates an access pass on portable media which includes a viewable image of the person and the identification document, and alphanumeric identification data for the person. The access pass can also include machine readable media which comprises a coded representation of the unique identifier.

U.S. Pat. No. 8,145,183 is described as disclosing an emergency locator system adapted for GPS-enabled wireless devices. Global Positioning System (GPS) technology is and Location Based Services (LBS) are used to determine the exact location of a user and communicate information relating to the emergency status of that location. The user initiates the locator application via a wireless device and their physical location information is automatically transferred to a server. The server then compares the user's location with Geographic Information System (GIS) maps to identify the emergency status associated with their location. Once the server has calculated the current emergency status, the information is automatically returned to the user, along with emergency instructions.

U.S. Pat. No. 8,045,954, is described as disclosing a method of providing emergency related information to and from a centralized location over a wireless network. The method utilizes cellular phones in emergency communications and entails two embodiments that employ location-aware technologies, in portable form, in security applications. One embodiment serves as a modern high-tech "neighborhood watch," enabling law enforcement access to the many "eyes and ears" of the public simultaneously via available cell phones. Cell phones with embedded digital cameras allow the instant capture and remote submission of suspicious circumstances to law enforcement through pictures or video.

U.S. Patent Publication No. 2006/0168185 is described as disclosing arrangements for collecting, analyzing, consolidating and delivering consolidated and enhanced data from a plurality of sources relating to a current event, to a third party, and reserving the consolidated and enhanced data for internal use so as to create a commercial proactive emergency management and disaster response information system that can also be used for emergent commercial purposes. A data capture device associated with an individual or a location captures data related to a current event or affected site. Incoming data may include raw data, repackaged data, or value-added data from source inputs. Captured data is sent to a centralized command center or distributed command centers where it is analyzed, resolved, correlated and repackaged for use by other parties.

U.S. Pat. No. 7,808,378 is described as disclosing an alert notification system and method for neighborhood, business, work location, community and other groups for broadcasting an alert message from one member of the group to the other members of the group. A member of the group who sees or hears of an alert condition, which may be criminal activity, suspicious character(s), animal running loose, natural or man-made disaster or the like, becomes an alert initiator by calling a centrally based alert processing device that, after verifying the caller is a member of a group, allows the caller to record an audible alert message describing the alert situation. The processing device then broadcasts the alert message to each member of the alert initiator's group or groups so the alert recipients may take appropriate action to protect lives and/or property. The alert processing device stores infatuation regarding the caller and the message for later auditing and retrieval purposes.

U.S. Pat. No. 6,842,774, is described as disclosing alerts are generated at mobile entity devices and servers. The alerts are examined at the servers and handled by the server and/or forwarded to a clearing house. At the clearing house, emergency events are created in response to the alerts by an event module. A notify module compares events to an information need associated with a subscriber profile to determine whether a subscriber associated with the subscriber profile should be notified about events. The notify module also handles interactive search requests from a client for the events.

What is needed in the art is a virtual badging system. Such system must be able to function in a 100% disconnected environment and include a cell phone and/or a simple, inexpensive, lightweight, reusable, electronic device capable of either scanning and/or storing data, images, and/or photos, and being linked to a smart phone or dumb phone to assist in entry or re-entry into restricted areas, while providing unique field monitoring solutions to managers in any type of technology connected or disconnected environments.

SUMMARY OF THE INVENTION

The present invention is a method, system, and device for use in various stages of operations before and after a disaster. Due to the customizable nature of the software described herein, coupled with ever-changing DHS directives, the present invention is designed for use in non-disaster purposes as well, including but not limited to: gated community access, restricted access areas, business management applications, user-to-user and user-to-business social networking, and planned or spontaneous volunteer management.

The virtual badge system, method, and device evolve into another level to enhance the subject matter of the '440 patent and related applications by using advanced mobile art described herein. A virtual badge, which can be tracked if desired, can contain customizable data, photos, and/or images, which are scanable for various applications. The virtual badge is displayed on a cell phone and/or other electronic device and replicates what a typical plastic badge can display. This system also can incorporate the Internet and a cell system, or alternatively can be used by linking to a local Wi-Fi or other wireless network area, if so programmed. A separate device is presented, either synched with a cell phone or standing alone, as a cost-effective alternative to using expensive smart phone devices, so that a user may hang it around his/her neck with a lanyard. It is designed so any passerby can readily identify the user and/or a check point guard can readily observe and/or scan the device to verify the user's identity. The virtual badge, displayed on a cell phone and/or the device, can be pre-programmed to change colors or designs as well as automatically be pre-programmed to "self-destruct" the images, photos, and/or data for security reasons, pursuant to an administrator's specifications. For additional security and by using GPS, the virtual badge can be displayed on a map of the user's cell phone, a group leader's cell phone, a web based administrator's computer or a base server. Further, for more efficient management purposes, a group leader's cell phone can be authorized to display a map, which map reveals the locations of a designated group of virtual badge users. The entire new system can be linked into existing software systems using traditional hard and paper badging systems to augment them.

The virtual badge system is unique in that it can allow a badge applicant to submit a request through a web based portal, where an agency (or a business entity) like a Fusion Center or local Sheriffs office, can review and approve the request. After authenticating a request, soliciting a payment if desired, creating a unique number identifier, and performing a background check, if desired, the agency then could send out a virtual badge via an email or text SMS, or some other electronic means, to a cell phone number, where the virtual badge then could be displayed either on the phone screen and/or on to a separate device. Using this method, the applicant is not required to be in the physical presence of the reviewing agency's personnel, who normally then would have to print out a plastic or paper badge. This badge is created in a virtual world, allowing for approving and sending out virtual badges across the country or the world, immediately, and then allowing for tracking those virtual badges using still active cell service, if desired, as they are inbound to a location.

Upon arrival, if still linked via cell towers to a cell phone with GPS, the virtual badge can be mapped and tracked live. The virtual badge also could be designed to be tracked in a local area using wireless systems, such as but not limited to a radio frequency identification system (RFID), near field communication system (NFC), or other chip, with an added linked device on a user's lanyard, if desired. Combining methods described in previous applications, the virtual badge could be created with a laptop computer linked to an electronic display device, such as cell phones in an area with no cell service at all. In the 100% disconnected environment (such as a system not having any cell tower functioning), the virtual badge could be sent from a laptop or a server to cell phones and/or the devices, using wireless or hard wired technologies, as best fits the situation. Finally, and most importantly, this virtual badge can be mapped and tracked in a 100% disconnected environment following a disaster (or in any remote area where cell service does not exist).

The separate, electronic device described above could display a series of customizable data, photos, and/or images, which originate from the user's own synced or linked cell phone or alternatively from a central network administrator. These data, photos, and/or images also are designed to be viewed or scanned, and various settings on the device allow for flexibility for settings to both accommodate battery life as well as changes in views for the user. The device also can be used to track the device holder via technology described herein or additionally by making use of RFID or NFC technology. The device expands the capability of the system, while widening the scope of the invention to include mapping, tracking, and/or historical uses of the device and its holder, if desired. Because of its design and ability to erase its memory, the device can be re-used multiple times for many different users, unlike present plastic badges.

The present invention can further allow for tracking and monitoring the use of the virtual badge via other means. Through a scanning device, which could include a check point's use of a Smart Phone with this system which includes its own scanning software, or through simply passing by an RFID or NFC reader, the system can log the time and date of that virtual badge user passing that check point. As an example, in a 100% disconnected environment, with a cached memory of approved virtual badge data stored within the Smart phone of a guard at a check point, the guard could verify the virtual badge holder by scanning the guard's phone's camera over the virtual badge holder's optical machine readable representations of data as part of the displayed image of the badge, such as linear QR or bar code images, thus retrieving from his/her Smart phone's memory a photo of the virtual badge user to compare with the person in front of the check point's guard, as an example (NFC offers another variation). The new system further can allow a supervisor to visualize on a displayed map on his/her mobile device where all the virtual badges in a designated group currently are located.

The administrator or designee likewise could use the virtual badge data to facilitate seamlessly organizing crews according to the Incident Command System (ICS). The system also can add or change the data stored in the virtual badge at any time through administrative procedures like scanning a user's driver's license, which may contain additional data to store in the virtual badge. The system can analyze and monitor the use of the virtual badge given the historical data provided by various ingresses and egresses past check points tied to the system, including in a 100% disconnected environment. Alternatively, the system can be linked to other systems for further analysis or integration on a more broad monitoring system via an API link into another system.

The software used in the present system, methods, or devices is designed to permit the cell phone and/or the device to automatically or manually download the information stored as data to a laptop "server" or other device which functions as a "server", including datacenter based servers ("cloud" servers), when the cell phone and/or device is within BLUETOOTH®, cellular, or other wireless service range of the server. In the situation where there is no cell service, a cell phone and/or device can communicate to the laptop server or opther server without the use of cell towers or the Internet, which in a totally or partially disconnected environment, is the setting frequently confronting users. This system relies upon common software designs which can incorporate Unix, Windows, Java, and other common technologies programmed into this application to allow the cell phones and/or devices to optimize their effectiveness, as well as cell phone operating systems included but not limited to: Apple's iOS and variants, Google's Android and variants, RIM's BLACKBERRY® OS, and Windows Mobile OS.

As an illustrative example, a method of identifying an individual using an electronic identification system utilizing a virtual badge may comprise the steps of establishing a customizable set of data to be included in an electronic identification system database for identifying one or more individuals from a user group using a virtual badge; identifying at least one individual that requires electronic identification using said virtual badge; providing an electronic profile for said individual; creating a virtual badge based on said electronic profile; said virtual badge having information, images, or combinations thereof which identify said individual; providing each said individual access to said virtual badge; and downloading said user's virtual badge to a first display device, and displaying said virtual badge on a first display device. The method may further include mapping, tracking, or combinations thereof, said virtual badge downloaded or displayed on said first display device. The first display device may further be linked to a second display device so that virtual badge image displayed on said first display device will be displayed to a second display device.

In an alternative embodiment, the method of identifying an individual using an electronic identification system utilizing a virtual badge may comprise: establishing an administrative entity for administering an electronic identification system using a virtual badge; identifying at least one user group to be registered with said administrative agency, said user group having at least one individual member requiring the use of said virtual badge; said administrative entity establishing a customizable set of data to be included in an electronic identification system database for identifying one or more individuals from a user group using a virtual badge; each said individual member registering with said administrative entity, said registration including providing information which identifies said individual; creating said virtual badge for each said individual of said user group, said virtual badge having one or more identifying indicia unique to each said individual; storing said virtual badge on a server administered by said administrative agency providing each said individual of said user group access to said virtual badge; and displaying said virtual badge on a first electronic display unit. The method may further include mapping, tracking, or combinations thereof, said virtual badge downloaded or displayed on said first display device. The first display device may further be linked to a second display device so that virtual badge image displayed on said first display device will be displayed to a second display device.

In another alternative embodiment, the method of providing a virtual identification badge to an individual for providing access to a predetermined area may comprise: establishing an administrative entity for administering an electronic identification system using a virtual badge for access to a predetermined area, said administrative entity registering and issuing said virtual badge to an individual authorized to receive said virtual badge; providing an individual to be registered with said administrative agency; establishing a database having identifying information related to said individual, said data stored on a remote server controlled by said administrative entity; creating a virtual badge for said individual, said virtual badge having one or more identifying indicia unique to each said individual, one or more information identifying said administrative agency, or combinations thereof; providing said individual with electronic access to said virtual badge; displaying said virtual badge on a first display unit, and providing an on-site administrator for verifying the contents displayed on said virtual badge. The method may further include mapping, tracking, or combinations thereof, said virtual badge displayed on said first display device prior to reaching the predetermined are, while within the predetermined area, or after exiting the predetermined area. The first display device may further be linked to a second display device so that virtual badge image displayed on said first display device will be displayed to a second display device.

Accordingly, it is an objective of the present invention to provide a system, method, and device for electronic identification.

It is a further objective of the present invention to provide a system, method, and device for electronic identification with a virtual badge to provide a cell phone and/or a device equipped with GPS and having GPS functions with BLUETOOTH® or other wireless technology which can indicate the locations of other similar devices without input from the operators of the other devices. Real time tracking can thus be achieved as well.

It is yet a further objective of the invention to provide a system, method, and device for electronic identification with a virtual badge to provide a series of various methods to apply for, enroll, create, authorize, manage, monitor, authenticate, and mass distribute virtual badges to mobile users via methods described herein.

It is yet a further objective of the invention to provide a system, methods, and device for electronic identification with a virtual badge to provide cell phones equipped with GPS and having GPS functions with BLUETOOTH® or other wireless technology which can communicate with each other and also with a base station. Data can be transferred between cell phones and also between the cell phones and the base station.

It is yet a further objective of the invention to provide a system, method, and device for electronic identification with a virtual badge to provide a functional and efficient database to serve as the repository for all information gathered in the field via a cell phone equipped with GPS and having GPS functions with BLUETOOTH® or other wireless technology.

It is yet a further objective of the to provide a system, method, and device for electronic identification invention with a virtual badge to provide the means for an authorized and affiliated Governmental or private entity (typically a County or Parish's Emergency Management Team) to control a disaster response operation, using integrated, ICS systems and forms, via the cell phone equipped with GPS and having GPS functions with BLUETOOTH® or other wireless technology, which interfaces with a web-based or laptop version of the cell phone software to allow for administrative activities.

It is yet a further objective of the invention to provide a system, method, and device for electronic identification with a virtual badge to allow users to create discrete groups, businesses, organizations, and affiliations via a cell phone equipped with GPS and having GPS functions with BLUETOOTH® or other wireless technology for the purpose of business management and user privacy.

It is yet a further objective of the to provide a system, method, and device for electronic identification invention with a virtual badge to provide organization tools via a cell phone equipped with GPS and having GPS functions with BLUETOOTH® or other wireless technology, such that responders and users in the field can customize the organization of their workers and users into groups as desired by an administrator.

It is yet a further objective of the invention to provide a system, methods, and device for electronic identification invention with a virtual badge to provide inventory management related tools via a cell phone equipped with GPS and having GPS functions with BLUETOOTH® or other wireless technology, such that responders and users in the field can easily create and maintain inventory lists for further reference.

It is yet a further objective of the invention to provide a system, method, and device for electronic identification invention to provide a mobile credit card payment system and credit card payment gateway for mobile users to process payment via a cell phone equipped with GPS and having GPS functions with BLUETOOTH® or other wireless technology, for virtual badge jobs or purchases completed in the field.

It is yet a further objective of the invention to provide a system, methods, and device for electronic identification with a virtual badge to provide privacy controls via a cell phone equipped with GPS and having GPS functions with BLUETOOTH® or other wireless technology for the purpose of allowing users in non-disaster purposes the ability to "hide" their location (and information submitted) from other discrete users, groups, businesses, organizations, or affiliations, subject to an administrator's approval.

It is yet a further objective of the invention to provide a system, methods, and device for electronic identification with a virtual badge to provide the user with tools for integration with existing software (via software APIs) such that the data collected via a cell phone software system may be exported and integrated for additional disaster response uses, reporting, analytical, or business development purposes.

It is yet a further objective of the invention to provide a system and a method to display a virtual badge on a cell phone equipped with GPS and having GPS functions with BLUETOOTH® or other wireless technology, in order to provide sufficient mass produced and inexpensive identification to allow monitored access to restricted areas or planned events.

It is yet a further objective of the invention to provide a system and a method to sync a cell phone equipped with GPS and having GPS functions with BLUETOOTH® or other wireless technology with a separate device to display a virtual badge.

It is yet a further objective of the invention to provide a system and a method to sync a Wi-Fi network or Mesh Wi-Fi network with BLUETOOTH® or other wireless technology with a separate device to be able to display a virtual badge, without a cell phone.

It is yet a further objective of the invention to provide various business models for payment to public and private sector entities, including a combination thereof.

It is yet a further objective of the invention to provide a variety of security features which can be incorporated into a design and may be automated to change so as to minimize the threat of counterfeiting virtual badges.

It is a further objective of the invention to provide a system which allows administrators to make use of new mobile technologies to be able to more easily allow users with this system to scan virtual badges with their own devices rather than having to use current devices built solely to scan bar codes, badges, or identification cards.

It is yet a further objective of the invention to provide workforce and business management tools via the cell phone equipped with GPS and having GPS functions with BLUETOOTH® or other wireless technology which can automatically download data stored on the cell phone to an internet-based server (generally referred to as the "Cloud") or a laptop server with the back end software. All authorized data that is submitted in the field may be accessed by authorized virtual badge users as soon as it is available on the server, near-instantaneously when the cell phones and server are connected to a wireless network, or after the data has been uploaded via BLUETOOTH® or other wireless technology in a disconnected environment. Given the sensitivity of the data, encryption and security levels can be set by an administrator.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIGS. 7A-C are perspective views of a "Smartphone" and "Tablet" with GPS and GPS function with BLUETOOTH® according to a preferred embodiment of the present invention;

FIG. 16 is a flow diagram of the procedure utilized by a regional commander to manage resources and assets in the event of an emergency;

FIG. 26 is a diagram of two ways of a separate electronic device with the virtual badge connecting either through a router to a Wi-Fi or Mesh Wi-Fi Network or to a cell phone;

FIG. 27 is a flow chart displaying an example of the life cycle of a user requesting the virtual badge through to the self-destruction of the virtual badge.

DETAILED DESCRIPTION OF THE INVENTION

Figure 1:
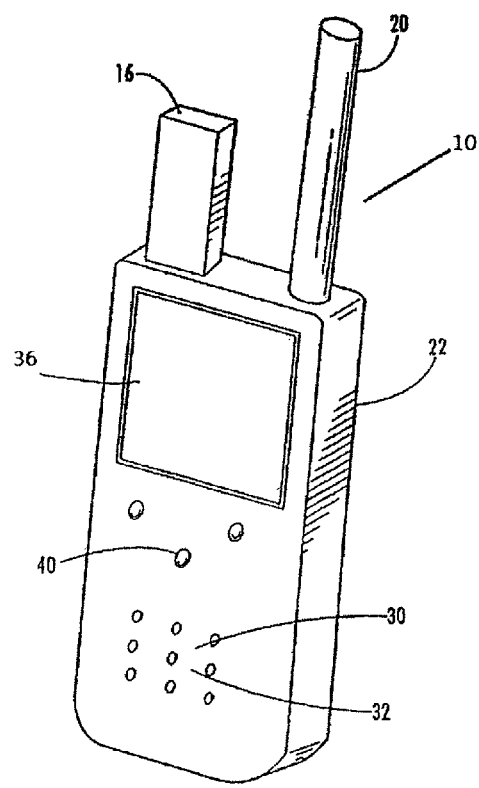
FIG. 1 is a perspective view of a combined GPS/radio device according to an illustrative embodiment of the present invention.

While the present invention is a susceptible embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention creates a system comprising of "backend" software (software adapted to provide necessary functionality for server) on a web based or laptop server synchronized with a "front-end" software, such as software adapted to be used by a display device, including an electronic display device capable of displaying images or text, such as a cell phone or tablet computer, to make the device function accordingly, i.e. properly display the information as a virtual badge, displayed on the electronic display device. The backend software system is designed for, but is not limited to, mapping, tracking, authenticating, validating, background checking, managing, distributing, and monitoring an individual and/or designated group of virtual badge users. The front-end is designed to communicate with the backend software system and interact in such a way to create a workforce solution. The system allows added plug in features, i.e. software programs that provide additional functionality that can be added to or taken out of the primary software systems in place and include, for example, field forms with photos displayed on a map to maximize the capabilities of the virtual badge system. While various methods of communications and data transfer may be described, such examples are for illustrative purposes only as the use of any land-based communication systems or satellite-based communication systems known to one of skill in the art can be utilized within the systems, devices, or methods as described herein.

To utilize their BLUETOOTH®, wireless, and/or GPS functions in a disconnected environment, modifications to the software in the electronic display device, such as a cell phone, including smart phones, or a computer tablet, such as APPLE's IPAD, are made prior to their use in the operations via the new software. Once these modifications have been made they do not need to be changed except as the user goes into and out of a working cellular network (or the network is re-established by repairs). These modifications can be made utilizing BLUETOOTH® or other wireless communications from a base station or on the cell phone unit itself if the model has such capability. As another example, a GPS/cell phone can be used when modified, and with additional programming and/or modifications as well as newly developed cell phone hardware, a host of other phones can utilize this system. Newer cell phone models may not require as extensive a modification, but to work in the disconnected environment, changes are still needed. To allow for monitoring of other dumb and smart phone users simultaneously within a group by a smart phone supervisor, modifications designed within this system also are required for the front end user.

In the proposed system, first, an administrator, which could be an agency, a business, a group, and/or simply a resident/citizen (hereinafter collectively referred to as an "administrator"), would register on a web based portal to obtain access to the software described herein. In a disconnected environment, alternative means described herein may be used. Validation like a background check could occur at this stage of this entity or person. The administrator can then select from a menu of options (or customize further selections, if desired), which options create a specified list of registry items required to secure a virtual badge. These items could include as wide or narrow a list as desired. Some examples would be an ID photo, home address, business address, unique ID number, driver's license number, or a host of other options to be established by the administrator. Additionally, if desired, the software will allow the administrator to brand both the front end and back end so that the web or mobile device view can easily incorporate a logo or a group of logos. Similarly, the cell phone splash page is easy for an administrator to customize, if so desired, so that a unique identifier accompanies the software application distribution.

A payment for this first step also can be included, with various levels of approvals such as security clearances, or alternatively volume based pricing, established as further alternatives to the business methodology proposed. For a further example, if this initial application were to a Sheriffs office, such a fee could be split three ways between the Sheriff, a local police department, and the administrator. Incentives to recapture costs for maintaining and sustaining the system are thus modeled in a true public/private partnership.

In a next step, users with cell phones with GPS and BLUETOOTH® and/or other wireless technology can apply to the administrator for a virtual badge to be part of that grouping. Alternatively, the administrator could elect to send requests to a designated group of front end users. Either using their phone to apply via a web link or by registering on line via the Internet, each user then can supply the personal data as pre-established by the administrator to be approved for a virtual badge. Following the submittal of the personal data, the administrator can analyze the application, including if desired, outsourcing a background check of that user by a third party service. The same administrator may choose different levels of checks for different users, as well as may choose different badges for different events. As a further business method step, an additional payment can be made either by the administrator or by the user prior to the issuance of each virtual badge. Volume discounts and differing clearance levels can lead to various pricing models. All of these processes can be automated in the back end system.

Upon approval by the administrator and payment option if chosen, the cell phones and/or devices are sent an email, SMS message, or other electronic communication via methods described herein, with the appropriate front end software, which also includes the virtual badge. Alternatively, this process could be obtained through an on-line Apple and Android stores.

The user then opens the message and/or downloads the application, and the front end software is downloaded into the phone and/or device, which software contains:

The virtual badge software can include any combination of the following options, abilities, and features, which also may be added to and further customized by an administrator via plug ins, including an administrator "ghosting" any particular selection so as to not offer certain options to some virtual badge users in a group, dependent on various security issues.

"Profile Surveys": allows users to create and complete surveys of personal information which may include their additional certifications, skill-sets, interests, likes/dislikes, and preferences for matching logic purposes inherent in the design of the software.

"Pathfinders": allows users to sort, select, and view other users they have affiliated with, as well as control privacy settings and search for and add new users or groups.

"Time-Frame Views": allow users to view historical data that represents the breadcrumb trail particular users traveled, based on a selected and customized time-frame selected by the user. This "breadcrumb trail" shall consist of but not be limited to: user/device path (represented by connecting symbols displayed on the map), form submissions, notes, events, and work orders submitted within the time frame selected.

"Main Menu": allows users to perform various submission-related functions in the software, including but not limited to: filling out forms (with or without photos), submitting a note, creating an event, completing profile surveys, and marking a place on the map.

Clock In/Out": allows users to clock in or out of their various affiliations, meaning that a user is able to manage their privacy and submission settings for all affiliations the user belongs to. "Clocking In" represents enabling the authorized affiliation to view the user on the map and view submissions that are sent to this affiliation, while "Clocking Out" represents disabling the authorized affiliation from viewing any user-related information, including but not limited to: GPS location, Data Submissions, Location Information, and Messaging.

"Sign Out": allows users to end their current session, which turns off the client-server connection and shuts down the application.

"Organization and Assignment Screen": allows users to easily create groups, teams, and task forces to organize and manage their users. The Organization and Assignment Screen also allows users to be tasked for functional purposes, by allowing users to be assigned to Tasks, Needs, Work Orders, Events, Affiliations, and potentially other uses. Users may be organized and assigned to tasks via a "Drag and Drop" interface. Users may be sorted based on their profiles, skill-sets, ICS certifications, or other classifications via "Matching Logic".

"Forms": Modern Smart phones can be programmed with this system to create a unit's custom forms. Forms also can be customized readily on the laptop "server" or via administrative access at the base station and which optionally may integrate the text messaging feature of cell phones to complete certain information on the forms such as name and address. These forms consist of several different types of template "form fields", which are preset data-entry methods on the cell phone. These "form fields" may be customized to collect a wide range of information and the user may choose to assign branching logic or decision point logic in the forms. Comment sections can allow the user to enter any texted wording the mobile user desires. Alternatively, the forms can employ dropdown menus for pre-programmed answers which can be selected to standardize certain responses so as to increase the speed of entry of data by mobile users. For example, there can be a "minor damage or major damage" drop down option to select. When the form is submitted to be saved into the phone (or into the server if the cellular network is functioning), the system automatically geocodes and time/date stamps the information contained on that specific form. The forms may also optionally attach geocoded photos to the information so a picture can provide reference to the form information. On the display of a form, the icon can be programmed to be highlighted with varying colors on a map. Alternatively, thumbnail photos might be displayed on a map, again with programmed highlighting with varying colors. Said highlighting may indicate a priority of a need at that location or level of damage, with the color groupings being sortable on the map to allow for quicker visual analysis. Prior to saving the form, the user is asked if the form needs any final editing before being saved.

"Matching Logic": refers to complex software algorithms that classify users based on their responses to profile surveys, allowing for users to be matched to appropriate Tasks, Needs, Work Orders, Events, Affiliations, and potentially other uses because the users' skill-sets match with the services needed. Users may be classified based on customizable information, (Ex—Profile surveys may classify based on functional skill-set, such as medical, physical, technology, leadership, etc.), and a corresponding Task, Need, Work Order, or Event may be customized to need one of these functional skill-sets. The appropriate users may then be matched to the appropriate Task, Need, Work Order, Event, or Affiliation. Likewise, as a user completes more details of his/her own profile and skill sets, that user may be better "matched" with a group or organization which has listed its own set of profiles into the system in its own search for like-minded or like-skilled users.

"Who Can See Me": refers to an ability in the software that grants the user the ability to disallow other users from viewing or receiving GPS data, submission data, and any location information about the particular user (ex—User A turns off User B's ability to see User A on the Map as well as any of User A's information).

"Friends": refers to users that the end-user has added to their application in terms of receiving tracking and electronic submission data. Users are assigned "Friend Codes", which are unique identifiers that allow for user search to take place and for user created sub-groups.

"Notifications": allow users to view at-a-glance any status updates or pertinent information from selected users, and functions as a rudimentary news feed to the user, displaying updated information about the user's affiliations, coworkers, friends, and family.

"Synch Now": allows the user to synch the cell phone with the laptop server or cloud server by utilizing either BLUETOOTH®, wireless technologies, or cellular networks.

"Start Break": allows the user to note a break time start and stop point to monitor his/her work cycle during the operations.

"Message": allows the cell phone operator or base server to text message each other or other operators via a canned, preprogrammed or custom message. Text messaging in a disaster environment can occur over partially destroyed cellular networks where voice communication has failed entirely.

"Setup": allows the user to enter into their cell phone the phone number and company name or name of the agency for which they are working.

"Change User": allows the user to change his/her password or user name.

"GPS": allows the user to check the status of the GPS tracking unit and note any errors in communication of the GPS chip within the cell phone.

"Map": allows the user to view a map as loaded by the system into the cell phone.

"Map Trail": allows the user to randomly drop points on a map, which option triggers a call to connect a line of such GPS points so as to display a distinct and measurable line on the back end displayed map. A Start and Stop dropdown use can map the location and distance of a flooded roadway, for a base unit to display to the administrator for actionable data.

"BLUETOOTH® Sync": allows the user to toggle between using just BLUETOOTH® or just the cellular phone network, depending on the circumstances.

"Diagnostics": allows the user to view his/her name, phone number, software application name, version of the software application, synch interval, last synch time, last upload time, number of synchs synch errors, and message counts collected by that user.

"About": allows the user to view the name of the system, the contact info, and the version, along with a copyright date.

"Shutdown": allows the user to shutdown the software (again, in certain circumstances, an administrator may ghost out this option so a user cannot select the option).

Because the virtual badge is designed to be mapped and tracked (though GPS mapping is not a requirement of the virtual badge), the data is mapped out on a GPS mapping system which allows shape files to be overlaid for analysis. Further, the latitude-longitude information can be converted automatically within the system to the National Grid System which is used more by military responders. Likewise, the system may be integrated with a wide variety of software mapping systems to ensure interoperability. Additionally, the system can easily convert all of the collected data into Excel spreadsheets, which then are easily sorted using Excel technologies. Data can then be e-mailed out in a readily workable solution and/or can be converted into pie charts or other graphic images using, for example, Microsoft Access® to present a snapshot picture of thousands of data inputs from a single or multiple days' operations. Data can also be exported in a number of other formats. This back end part of the system is critical to make the "tsunami of data" easy to interpret for an administrator at any point in time.

Several features originally disclosed in the '440 patent and associated patent applications are currently described herein, as any one or combinations thereof can be adapted to be a part of the system, method, or devices for an electronic identification system using a virtual badge. The various devices described or contemplated therein are illustrative examples of electronic display devices and methods of use which can be incorporated with the virtual badge.

FIG. 1 illustrates an illustrative example of a portable GPS receiver combined with a radio transceiver into one unit 10. A plurality of other similar GPS/radio units 10A-10G communicate with each other utilizing a communications network 12, as illustrated in FIG. 2B. The GPS/radio units 10A-10G determine their various locations utilizing GPS, and can then transmit these locations to the other units over a wireless network. In this manner, the locations of all the units can be determined and monitored by any one of the units. The preferred embodiment of the present invention is also provided with a radio. The units can also communicate with each other over a public radio network such as FRS, GMRS or iDEN.

Figure 2A:
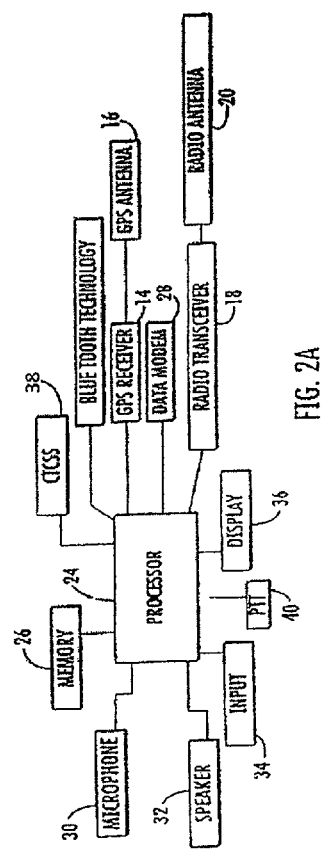
FIG. 2A is a block diagram of the components of the GPS/radio of FIG. 1.
Figure 2B:
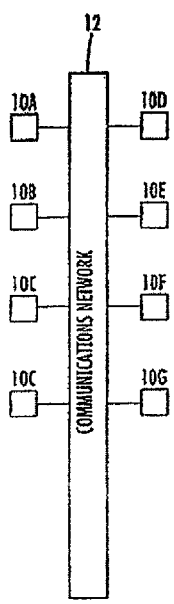
FIG. 2B is a block diagram of a communications network linking the GPS/radio unit of FIG. 1 with a plurality of other GPS/radio units.

Referring to FIGS. 1 and 2A, the GPS/radio of the present invention will now be described. The GPS/radio unit 10 includes a GPS receiver 14, a GPS antenna 16, a radio transceiver 18 and an antenna 20 all mounted in or on the GPS/radio housing 22. The GPS receiver is electronically coupled to processor 24 which in turn is electronically coupled to a memory 26. The memory 26 can be built into the unit 10 or removably connected thereto, such as a flash memory stick or removable cartridge (both not shown). The memory will normally contain the information necessary to operate the unit 10. The memory can also be used to store cartographic data (electronic maps), waypoints or locations which the unit's operator wants to save, waypoints of the other units and other data which may be input into the unit 10. The radio transceiver 18 is electronically coupled to the processor 24 and a data modem 28. The data modem is utilized for transmitting and receiving data such as location data of the units.

The electronic maps stored on the removable memory devices can be readily displayed on the unit's display 36. Waypoints or areas traversed by the unit and stored in the memory can also be displayed on the display 36. In a preferred embodiment, the display 36 is a liquid crystal display (LCD) and is used to display other information in addition to navigational information. Any other type of display may also be used. The unit 10 also includes a microphone 30, a speaker 32 and an input 34. The microphone 30 and speaker 32 are conventional and can be the same type of microphone and speaker used on a conventional FRS or GMRS radio.

Input 34, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 34 could also be a microphone, a voice recognition input, a touch screen, a full keyboard similar to a BLACKBERRY® or a menu driven display screen.

The GPS/radio unit also could include a continuous tone coded squelch system (CTCSS) 38 and a push-to-talk button 40. The CTCSS controls the audio output of the speaker so that only a desired transmission can be heard by the user of the unit 10. The push-to-talk button 40 can be any conventional pushbutton switch or control device normally found on short range two-way radios. The push-to-talk button 40 is coupled with the processor 24 to combine two important functions in a single button. The push-to-talk button 40 is operable to both initiate transmission of voice communications and transmission of a radio signal which indicates the GPS location of the unit. Additionally, this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 24 keeps the radio transceiver enabled for approximately 100-300 milliseconds to allow the transmission of the location data. The GPS/radio unit 10 can also include another feature which enables other individuals to determine its location. This is a "polling" feature wherein one unit 10 sends a request to the other unit's 10A-10G for them to transmit their locations back to the requesting unit. This request can be performed manually by the operator of the requesting unit 10 or the requesting unit can be programmed to perform this operation automatically at pre-selected time intervals. The locations of the other units 10A-10G are updated on the electronic map of the requesting unit so that at any time all the units can know where all the other units are. Any and all of the units can perform this location request. If the units are programmed to perform this automatically, then no input is required by any of the operators.

Another optional feature of the GPS/radio unit and/or cell phone is a coding or encryption system. This system can employ any of the known coding or encryption schemes such as public or private key encryption methods. To employ this feature, a group of GPS/radio users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

After these modifications have been performed, the team members go out into the designated search areas with their portable hand held GPS/radio units. At the beginning of every day a different route or search area is programmed into each unit, as well as different forms or work orders. Preferably each team will have the same route or search area and different teams will have different routes or search areas. As the team members cover the routes or search areas they will encounter individuals or locations which require specific needs. Various services to respond to these needs in disasters have been designated as Emergency Support Functions (ESF) and categorized with possible uses as follows (noting these ESF descriptions listed can vary state by state):

ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Logistics location including pharmaceutical supplies and medical personnel management; D-Mort service teams' and EMS personnel locations and assignments and precise locations.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security—incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint, wherein a particular need or service has been identified by the searcher, a 1-2 word descriptor can also be associated with the waypoint. This would help to clarify any ambiguities that a third party may have regarding a particular waypoint and emergency service that was associated with the waypoint. These descriptors could also be used to identify a particular need or resource that would be required at a particular area or site.

Figure 3:
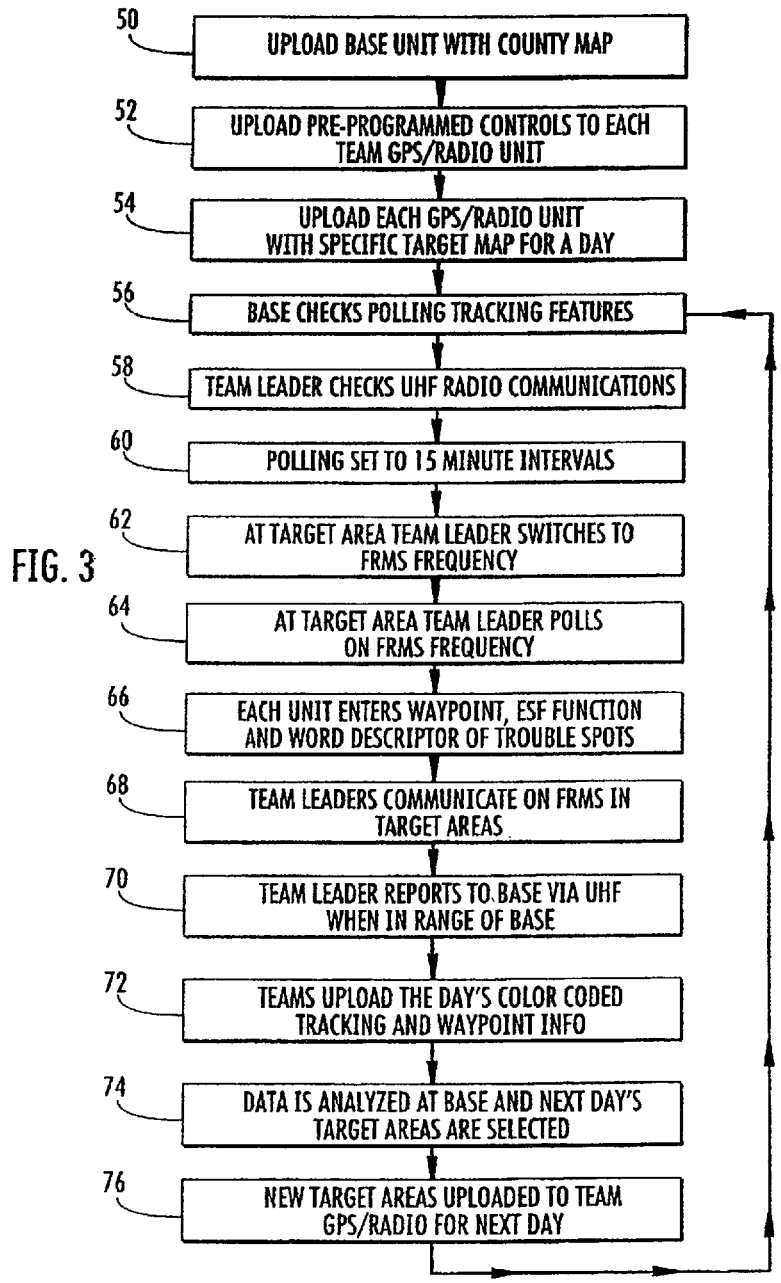
FIG. 3 is a flow diagram of the procedure utilized by the search and response teams.

With reference to FIG. 3, the operation of a typical search would proceed as follows. The base unit is uploaded with a map of the county or area surrounding the site of the disaster at 50. The individual team GPS/radio and/or cell phone units are uploaded with pre-programmed controls and settings at 52. The individual team units are uploaded with a specific target search map for one day at 54. The base unit checks the polling tracking features of the units at 56. The team leader checks the radio communications between his unit, the team members units and the base station at 58. These radio communications can be in UHF, VHF or 800 MHz frequencies as well as the IDENT network. The polling feature of the field units is set for 15 minute intervals at 60. After the teams reach the target or search area, they switch their radios to operate on the FRS radio frequency at 62 or rely upon the iDEN system. The team leader polls the team members on the FRS frequency or iDEN during the searching operations at 64. Whenever they reach a trouble spot the team members enter a waypoint, ESF number and descriptor into their individual units at 66. The team leaders communicate with each other over the FRS frequency or iDEN while in the search area at 68. The team leader reports in to the base station over the UHF, VHF or 800 MHz frequencies or iDEN when they are within range of the base station at 70. The team members upload the routes covered, searched areas and waypoints from that day to the base station at 72. While the upload is preferably preformed wirelessly, any other type of data transfer is acceptable. These routes or search areas may be color coded. The data uploaded into the base station unit is analyzed and the next day's search areas or route are determined at 74. The new search areas or routes are uploaded into the teams' individual GPS/radio units at 76 and the procedure then returns to step 56. While the new routes are preferably uploaded wirelessly, any other type of data transfer is acceptable.

Figure 4:
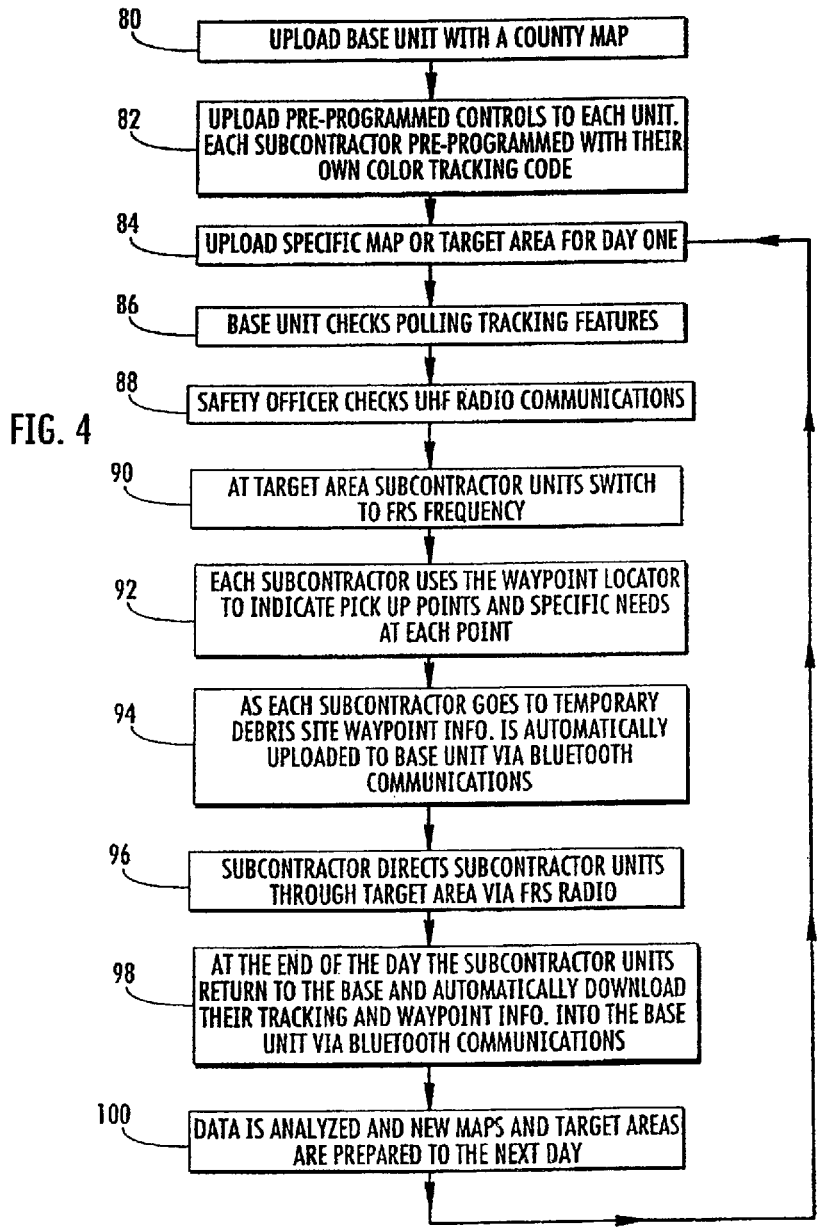
FIG. 4 is a flow diagram of the procedure utilized by a cleanup contractor.

With reference to FIG. 4, the procedure of a typical cleanup operation after a disaster is described. The base unit is uploaded with a map of the county or area surrounding the site of the disaster at 80. The subcontractors' units are pre-programmed with controls, settings and color codes at 82. The subcontractors' units are uploaded with a specific maps, target areas, forms and notes for the day at 84. The base unit checks the polling tracking feature of the individual units at 86 prior to dispatching the subcontractors. The safety officer checks the UHF, VHF or 800 MHz frequency or iDEN communications feature of the individual units at 88 which are GPS/radio and/or cell phone units. Once within the target area, the subcontractors' units are switched to operate on the FRS radio frequency or iDEN at 90. Each subcontractor uses the waypoint locator to indicate a pickup site and the specific needs at each site at 92. The subcontractors proceed to a temporary debris site within the target area. At this location the waypoint information which they have collected that day is downloaded to a unit at the temporary debris site via BLUETOOTH® communications at 94. This information is subsequently sent to a base station through the best methodology available during that moment in time, included but not limited to wireless or cellular data transfer as well as BLUETOOTH® technology. The subcontractor continues to direct the subcontractor units through the target area via FRS radio or IDEN at 96. At the end of the day the subcontractor units return to the base station and automatically download their tracking and waypoint information to a base station unit via BLUETOOTH® communications at 98. The data is analyzed and new maps, target areas, forms and notes are prepared for the next day's operation at 100 and the procedure then returns to step 84.

Figure 5:
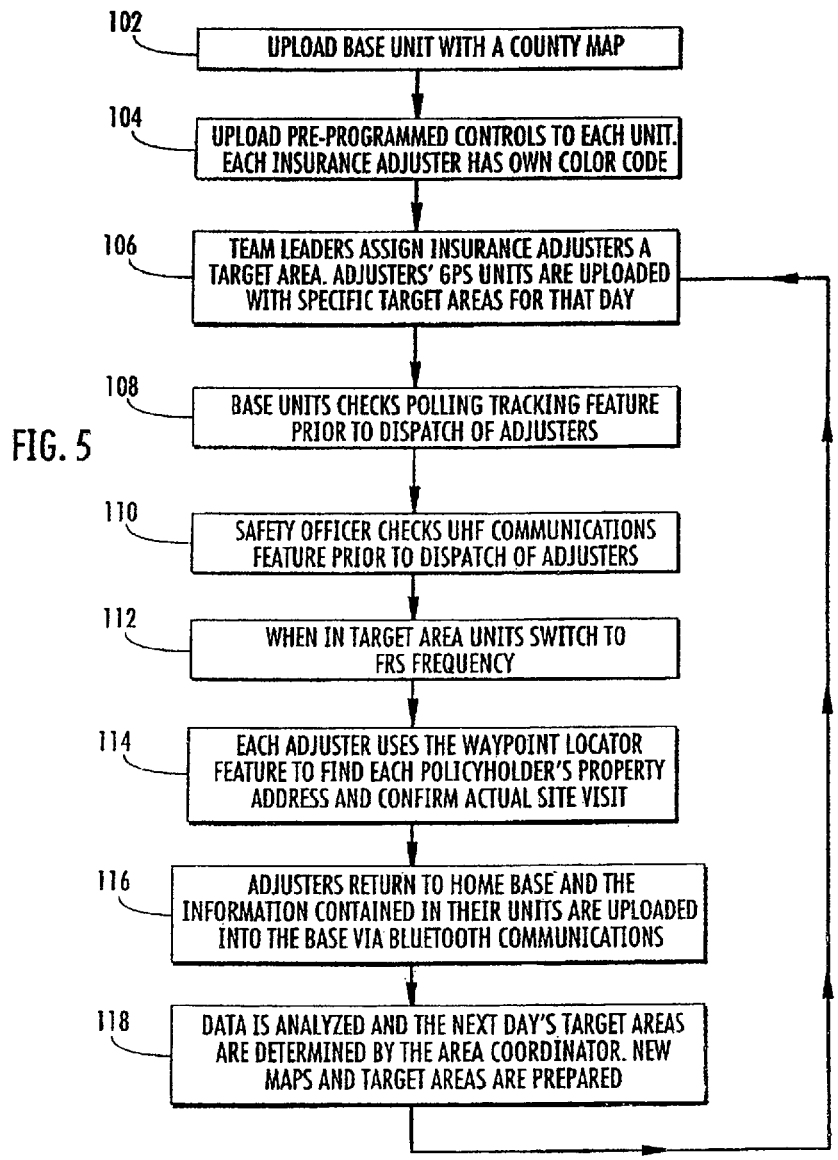
FIG. 5 is a flow diagram of the procedure utilized by insurance company adjusters.

With reference to FIG. 5, the operation of a typical insurance company's adjuster's visit to a disaster area is described. The base station unit is uploaded with a map of the county or area surrounding the site of the disaster at 102. The individual insurance adjusters' GPS/radio and/or cell phone units are uploaded with pre-programmed controls, settings and color codes at 104. The team leaders assign the insurance adjusters a target area, and the adjusters' GPS/radio units are uploaded with the specific target areas to be covered that day at 106. The base station unit checks the polling tracking feature of the adjusters' units at 108, prior to dispatching the adjusters. The safety officer checks the UHF, VHF or 800 MHz frequency radio or iDEN communications between the GPS/radio units at 110. After the insurance adjusters have entered the target area, they switch their radios to operate on the FRS radio frequencies or iDEN at 112. Each insurance adjuster uses the waypoint locator feature of their GPS/radio unit to locate each policyholder's property address and confirm the actual visit to the site at 114. The adjuster can then make notes regarding damages to the property in their own computers or other devices. The insurance adjusters return to the base station and the information contained in their units is uploaded into the base station unit via BLUETOOTH® communications at 116. The data is analyzed and the following day's target areas are determined by the insurance coordinator. New maps and target areas are prepared for the following day at 118 and the procedure then returns to step 106.

In addition to the users listed above, this system can be employed by any and all members of a first responder services such as Homeland Security, the military, the National Guard, Hazardous Material teams, non-governmental responders, volunteer groups, long term recovery organizations, public works department personnel, private sector responders, all other ESF personnel, and the Emergency Management Assistance Compact (EMAC). These individuals and associations will normally use the present invention to assist in the recovery, assistance, and cleanup after natural disasters such as hurricanes, tornadoes, floods and snow storms. However, the present invention can be used for any situation wherein a number of people require assistance like fires, power blackouts, etc., or just as a networking system.

Figure 6:
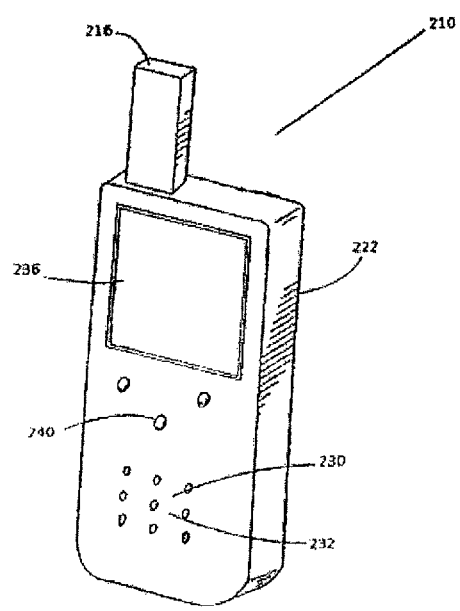
FIG. 6 is a perspective view of a cell phone with GPS and GPS functions with BLUETOOTH® according to an illustrative embodiment of the present invention.
Figure 8B:
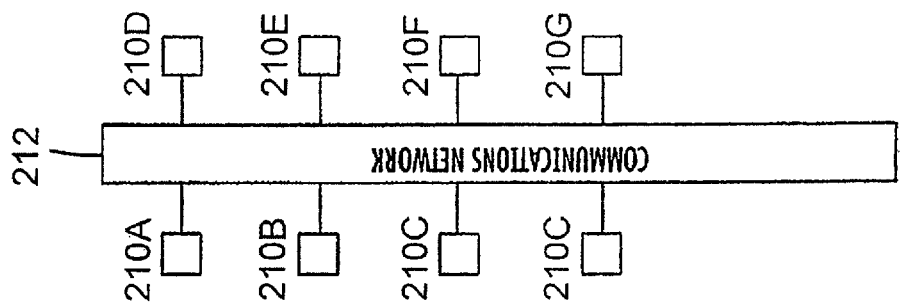
FIG. 8B is a block diagram of a communications network linking the cell phone of FIG. 6 with a plurality of other cell phones.

A portable cell phone 210 equipped with GPS and GPS functions/capabilities as well as BLUETOOTH® is illustrated in FIG. 6. A plurality of other similar cell phones 210A-210 G communicate with each other utilizing a communications network such as cell towers 212, as illustrated in FIG. 8B. The cell phones with GPS 210A-210G determine their various locations utilizing GPS, and can then transmit these locations to the other units over a network, if it is functioning. If the cellular network is not functioning, the center of the communications network shown on FIG. 8B as 212 becomes a server and/or laptop "server," instead of the cell tower system being the communications network. Either way, when the units are within range of a network 212, all the units 210A-210G can be determined and monitored by any one of the units. The plurality of cell phones is thus able to communicate with each other. Alternatively, they can also communicate with a base station. This feature enables the plurality of users of the cell phones to continue to perform their tasks even when they cannot establish communication with a cell phone network via a cell transmission tower. In areas which have recently been devastated by natural disasters, such as hurricanes, cell phone towers have been destroyed. The system of the present invention enables first responders and other personnel to communicate with each other and with a base station or headquarters when the only form of communication is the cell phones the first responders or other personnel are equipped with. The communications between the cell phones are both voice and data. The system of the present invention also enables a search and recovery operation to be established quickly with minimal expense and setup time.

Figure 8A:
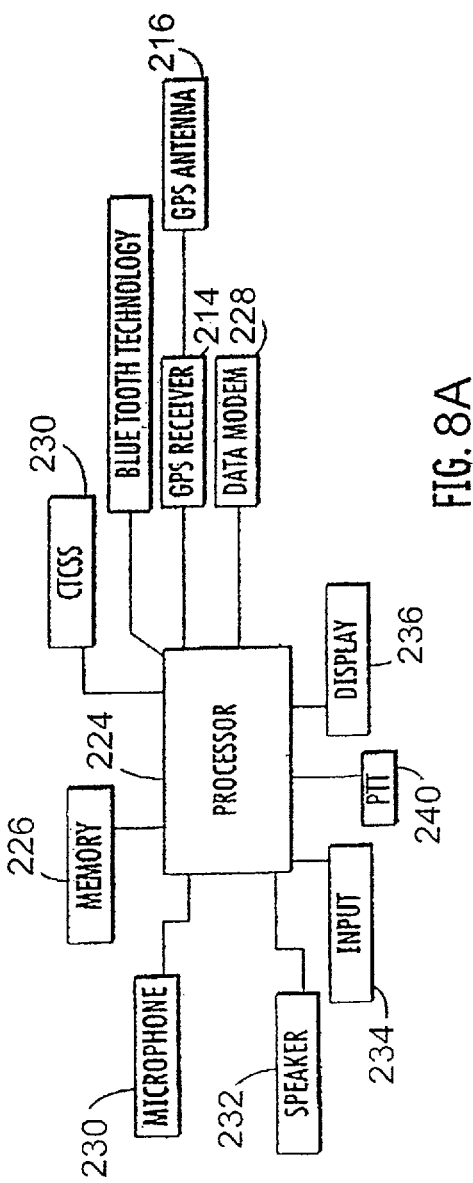
FIG. 8A is a block diagram of the components of the cell phone of FIG. 6.

Referring to FIGS. 6 and 8A, the cell phone with GPS of the present invention will now be described. The cell phone with GPS unit 210 incorporating BLUETOOTH® technology includes a GPS receiver 214 and a GPS antenna 216 mounted in or on the cell phone housing 222. The GPS receiver is electronically coupled to processor 224 which in turn is electronically coupled to a memory 226. The memory 226 can be built into the unit 210 or removably connected thereto, such as a flash memory stick or removable cartridge (both not shown). The memory will normally contain the information necessary to operate the unit 210. The memory can also be used to store cartographic data (electronic maps), waypoints or locations which the unit's operator wants to save, bread crumbs of the operator's tracks, waypoints of the other units and other assessment data, including but not limited to customized forms, notes, events, messages, and work orders, which may be input into the unit 210. The cell phone is electronically coupled to the processor 224 and a data modem 228. The data modem is utilized for transmitting and receiving data such as location data of the units.

The electronic maps stored on the memory devices can be displayed on the unit's display 236. Waypoints or areas traversed by the unit and stored in the memory can also be displayed on the display 236. In a preferred embodiment, the display 236 is a liquid crystal display (LCD) and is used to display other information in addition to navigational information. Any other type of display may also be used on the cell phone. The unit 210 also includes a microphone 230, a speaker 232 and an input 234. The microphone 230 and speaker 232 are conventional.

Input 234, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 234 could also be a microphone, a voice recognition input, a touch screen, a full keyboard similar to a BLACKBERRY® or a menu driven display screen.

The cell phone with GPS unit 210 can also include a continuous tone coded squelch system (CTCSS) 238 and a push-to-talk button 240. The CTCSS controls the audio output of the speakers so that only a desired transmission can be heard by the user of the cell phone 210. The push-to-talk button 240 can be any conventional pushbutton switch or a control device normally found on short range two-way radios. The push-to-talk button 240 is coupled with the processor 224 to combine two important functions in a single button. The push-to-talk button 240 is operable to both initiate transmission of voice communications and transmission of a radio signal which indicates the GPS location of the unit. Additionally this feature permits updated location information to be automatically transmitted each time the user transmits a voice transmission.

Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 224 keeps the radio transceiver enabled for approximately 100-300 milliseconds to allow the transmission of the location data. The cell phone with GPS unit 210 can also include another feature which enables other individuals to determine its location. This is a "polling" feature wherein one unit 10 sends a request to the other unit's 210A-210G for them to transmit their locations back to the requesting unit. This request can be performed manually by the operator of the requesting cell phone 210 or the requesting unit can be programmed to perform this operation automatically at pre-selected time intervals. The locations of the other cell phones 210A-210G are updated on the electronic map of the requesting unit so that at any time all the units can know where all the other units are. Any and all of the units can perform this location request. If the units are programmed to perform this automatically, then no input is required by any of the operators.

Cell phones with GPS units which include all of these features are complicated to operate and numerous intricate operational procedures must be memorized and/or deciphered to obtain the desired results. Many individuals who are involved in search operations after disasters such as hurricanes are ordinary individuals who are not familiar with the operation of these cell phones. Therefore, for the missions to be successful, these units need to be modified so that anyone could readily operate them.

Using as an example the Motorola Brute, Sanyo Model 7050, Pro 200 or 700 cell phones, the following modifications to the software in these cell phones are made prior to its use in the operations. Once these modifications have been made they do not need to be changed except as the user goes into and out of a working cellular network (or the network is re-established by repairs). These modifications can also be made utilizing BLUETOOTH® communications from a base station or on the cell phone unit itself if the model has such capability. As another example, a BLACKBERRY® Curve Model 3330 GPS/cell phone can also be used when modified as stated above, and with additional programming and/or modifications as well as newly developed cell phone hardware, a host of other phones can utilize this system. Newer cell phone models such as Android and iOS based devices may not require extensive modification to utilize their Bluetooth® or GPS functions in a disconnected environment. The cell phones with GPS and BLUETOOTH® are uploaded with the Pathfinder Task Force Eureka software which contains the following options, abilities, and features: "Forms", 'Pathfinders", 'Time Frame Views", 'Main Menu", "Clock In/Out", "Sign Out", "Who Can See Me Know", "Notifications", "Synch Now", "Start Break", "Message", "Message", "Setup", 'Change User", "GPS", "Map", BLUETOOTH® Synch", "Diagnostics", "About", "Shutdown:, "Friends" as described previously. Additional options, abilities and features include:

"Work Orders": can be tasked out to individual cell phones. Detailed information such as location, specific needs, tasks, or any "work" duties can be sent from the server to one or multiple cell phones via the system. Once sent to a phone or phones, the user has the ability to comment and enter in completion information on the work order, which then can be transmitted back to the base server, with automated time/date stamps that are geocoded at that location.

"Events": allows mobile users to create, invite, and confirm attendance for "Events", which are specified locations with time/date information attached within, including a description of activities and purpose.

"Notes": allows mobile users to create and submit text and photos without predetermined formatting. Mobile users may choose to submit notes privately or to any Affiliation they belong to.

"Profile Surveys": allows users to create and complete surveys that profile their skill-set, interests, likes/dislikes, and preferences for matching logic purposes inherent in the design of the Pathfinders Task Force software.

"Places": allows users to create and view locations specifically marked on a map. Users may share these "Places" with other users, and administrators may mark special places of interest for their users.

"Data View": allows users to easily access, view, and interpret GPS, submission, and location data as it appears on the map. The Data View is a front-end feature that displays selected map information in a standardized format on the cell phone.

"Aggregate Data Button": allows users to access a grid-style view of GPS, submission, and location data in chronological order. This interface provides users with the ability to sort and filter submitted information based on pre-determined attributes as well as allowing users the ability to export this information in a number of formats, compatible with $3^{rd}$ party software including but not limited to: Microsoft Excel, Tableau Server, Tableau Desktop, VirtualUSA, ArcGIS, ArcMAP Google Earth Pro, and Crystal Reports.

"Form Creator": allows users to create Forms and Profile Surveys, which are accessed by authorized users to fill out and complete. This Form Creator shall be accessible via the web and mobile platforms, and utilizes a "Drag and Drop" interface to create Forms to capture customized information via a multitude of different "Field Types". These Forms must be "Deployed" before additional users may utilize the Form.

"Field Types": refer to the different types of information the user is able to capture. These Field Types include but are not limited to: Alphanumeric Entry, Numeric Only Entry, Single-Select Multiple Choice Entry, Multiple-Select Multiple Choice Entry, Geotagged Photo Upload, Geotagged Photo Attach, Checkbox, Radio Button, Signature Capture, Barcode Scan, and Submit Button.

"Deploy Forms": refers to granting certain users, groups, and affiliations authorization to submit a particular Form. Forms must be Deployed before any user other than the creator to submit, and thus, Undeployed forms are listed as "Draft".

"Organization and Assignment Screen": allows users to easily create groups, teams, and task forces to organize and manage their users. The Organization and Assignment Screen also allows users to be tasked for functional purposes, by allowing users to be assigned to Tasks, Needs, Work Orders, Events, Affiliations, and potentially other uses. Users may be organized and assigned to tasks via a "Drag and Drop" interface. Users may be sorted based on their profiles, skill-sets, ICS certifications, or other classifications via "Matching Logic".

"Matching Logic": refers to complex software algorithms that classify users based on their responses to profile surveys, allowing for users to be matched to appropriate Tasks, Needs, Work Orders, Events, Affiliations, and potentially other uses because the users' skill-sets match with the services needed. Users may be classified based on customizable information, (Ex—Profile surveys may classify based on functional skill-set, such as medical, physical, technology, leadership, etc.), and a corresponding Task, Need, Work Order, or Event may be customized to need one of these functional skill-sets. The appropriate users may then be matched to the appropriate Task, Need, Work Order, Event, or Affiliation. Likewise, as a user completes more details of his/her own profile and skill sets, that user may be better "matched" with a group or organization which has listed its own set of profiles into the system in its own search for like-minded or like-skilled users.

After an operational duty has been inputted, with any related maps, the responder goes out into the designated search areas with the cell phone which has GPS features and functions. At the beginning of every day a different route or search area is programmed into each cell phone. Preferably, each team will have the same route or search area and different teams will have different routes or search areas. As the team members cover the routes or search areas they will encounter individuals or locations which require specific needs. These items can be inputted into the cell phone in the methods described above.

Figure 9:
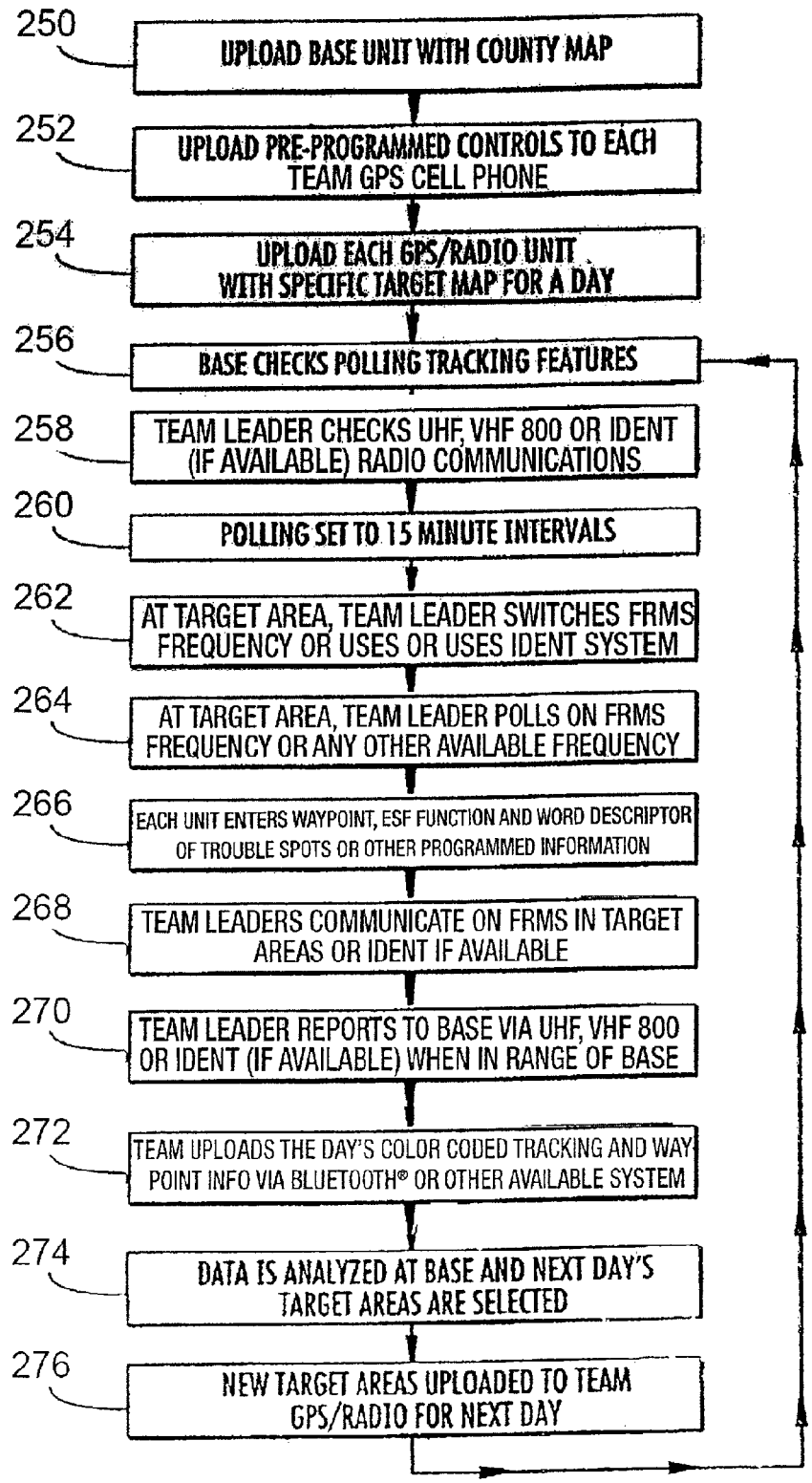
FIG. 9 is a flow diagram of the procedure utilized by the response teams.

The system also can recognize and list the Emergency Support Functions (ESF) and categorize (ESF 1-18) with possible uses as described previously:

With reference to FIG. 9, the operation of a typical search would proceed as follows. The base unit is uploaded with a map of the county or area surrounding the site of the disaster at 250. The individual team cell phones are uploaded with the Pathfinders Task Force Eureka software and with pre-programmed controls and settings at 252. The individual team units are uploaded with a specific target search map for one day at 254. The team members upload the routes covered, searched areas, assessment data, and waypoints from that day to the base station at 272. While the upload is preferably preformed wirelessly, any other type of data transfer is acceptable. These routes or search areas may be color coded. Any photos taken using the software can be tied directly to a related, custom form, all of which, when saved, is automatically time/date stamped and marked with that location via GPS. The data uploaded into the base station unit is analyzed and the next day's search areas or route are determined at 274. The new search areas or route are uploaded into the teams' individual cell phones at 276 and the procedure then returns to step 256. While the new routes are preferably uploaded wirelessly, any other type of data transfer is acceptable.

Figure 10:
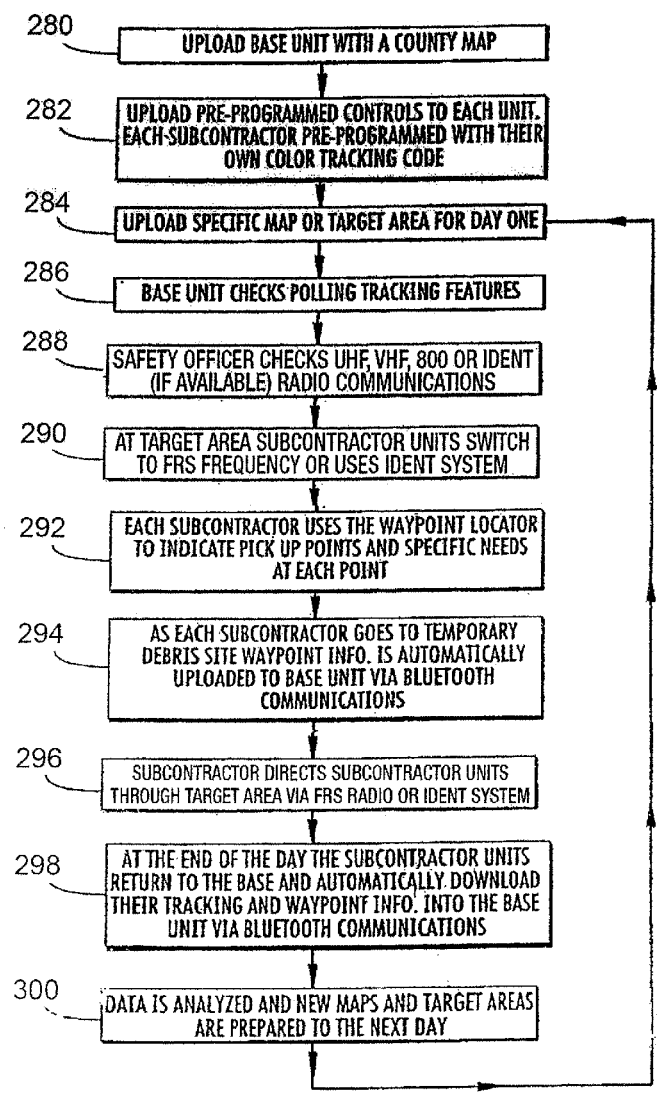
FIG. 10 is a flow diagram of the procedure utilized by a cleanup contractor.

With reference to FIG. 10, the procedure of a typical cleanup operation after a disaster is described. The base unit is uploaded with a map of the area surrounding the site of the disaster at 280. The subcontractors' units are pre-programmed with Pathfinders Task Force Eureka software and with controls, settings and color codes at 282. The subcontractors' units are uploaded with a specific map or target area for the day at 284. The safety officer checks the UHF, VHF or 800 MHz frequency communications or iDEN features of the individual cell phones at 288. The subcontractors proceed to a temporary debris site within the target area. At this location the waypoint information which they have collected that day is downloaded to a unit at the temporary debris site via BLUETOOTH® communications at 294. This information is subsequently sent to a base station. Any photos taken using the software can be tied directly to a related, custom form, all of which, when saved, is automatically time/date stamped and marked with that location via GPS. At the end of the day or during the work cycle, the subcontractor units return to the base station and automatically download their tracking and waypoint information to a base station unit via BLUETOOTH® communications at 298. Alternatively, a field server may be deployed with the software loaded into it to afford mobile users a remote download location without returning to a base. The data is analyzed and new maps and target areas are prepared for the next day's operation at 300 and the procedure then returns to step 284.

Figure 11:
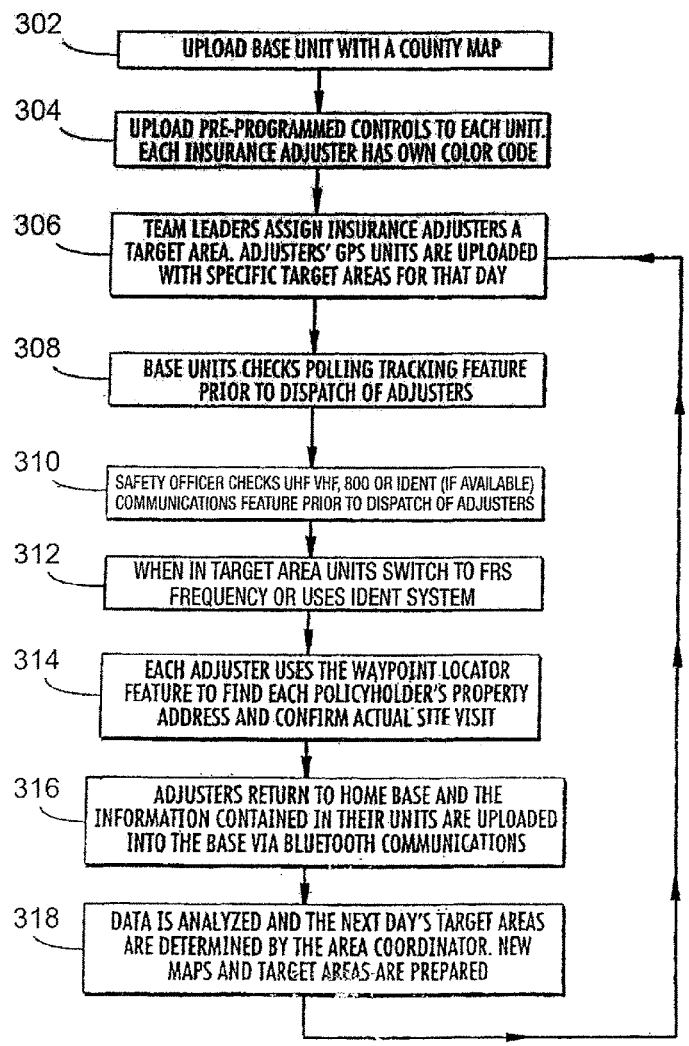
FIG. 11 is a flow diagram of the procedure utilized by insurance company.

With reference to FIG. 11, the operation of a typical insurance company's adjuster's visit to a disaster area is described. The base station unit is uploaded with a map of the area surrounding the site of the disaster at 302. The adjuster's units are pre-programmed with Pathfinders Task Force software and with controls, settings and color codes at 304. The team leaders assign the insurance adjusters a target area to be covered and the adjusters' cell phones are uploaded with pre-programmed controls, settings and color codes at 306. Each insurance adjuster uses the waypoint locator feature of their cell phone with GPS to locate each policyholder's property address and confirm the actual visit to the site at 314. The adjuster can then make notes regarding damages to the property in their own computers or other devices. Any photos taken using the software can be tied directly to a related, custom form, all of which, when saved, is automatically time/date stamped and marked with that location via GPS. The insurance adjusters return to the base station and the information contained in their units is uploaded into the base station unit via BLUETOOTH® communications at 316. Alternatively, a field server may be deployed with the software loaded into it to afford mobile users a remote download location without returning to a base. The data is analyzed and the following day's target areas are determined by the insurance coordinator. New maps and target areas are prepared for the following day at 318 and the procedure then returns to step 306.

In addition to utilizing cell phones to implement the system of the present invention, smart phones, such as the iPHONE® and tablet personal computers, such as the iPAD® can also be utilized to implement the system of the present invention. FIGS. 7A and 7B illustrate the front and back of a typical smart phone 301. The front of the smart phone includes a screen 303 which displays images and data obtained by the software programs of the smart phone. Buttons or controls 305, 4 of which are illustrated, extend along a lower portion of the smart phone. These buttons or controls are employed to perform different functions, depending on the software within the smart phone. A speaker 307 is located proximate an upper portion of the smart phone. This speaker is normally used to broadcast audio transmissions received by the smart phone. The smart phone is preferably encased in a material 309 which protects the smart phone from damage. A camera 311 is located on the rear portion of the smart phone. The camera is used to record video images for retention on the smart phone or transmission to another location. Each photo taken using the software can be tied directly to a related, custom form, all of which, when saved, is automatically time/date stamped and marked with that location via GPS. A connection 313 on an upper portion of the smart phone enables auxiliary devices, such as ear buds, to be connected to the smart phone. Another control 315 is located along a side of the smart phone. Control 315 is similar to controls 305.

A tablet personal computer, such as an iPAD®, is illustrated in FIG. 7C. The tablet computer 318 includes a screen 322 on the front of the computer. The screen 322 displays images and data obtained by the tablet computer. A control button 323 is located on the front of the tablet computer and in a lower portion thereof. Control button 323 is used to select certain options available within the software on the computer. The options can be, for example, Go Back, View the Operating System Main Menu, Search, etc. The control button is similar to the controls 305 and 315 on the smart phone. Button 323 can perform many different functions dependent upon the software operating within the tablet computer. A camera 325 is located in an upper portion of the front of the tablet computer 318. The camera is used to record video images for retention on the tablet computer or transmission to another location. Each photo taken using the software can be tied directly to a related, custom form, all of which, when saved, is automatically time/date stamped and marked with that location via GPS. One or more speakers 326 are located proximate a lower portion of the tablet computer. This speaker is normally used to broadcast audio transmissions received by the tablet computer. Buttons or controls 320, 321 extend along a side portion of the tablet computer. Button 320 can be employed to lock the computer from receiving any user input. Button 321 can be a volume control button. These buttons or controls are employed to perform different functions, depending on the software within the tablet computer. A button 319 on an upper portion of the tablet computer puts the computer into a hibernation mode and awakens it from this mode. Headphone jack 324, on an upper portion of the computer, permits audio output devices to be connected to the computer.

Figure 12:
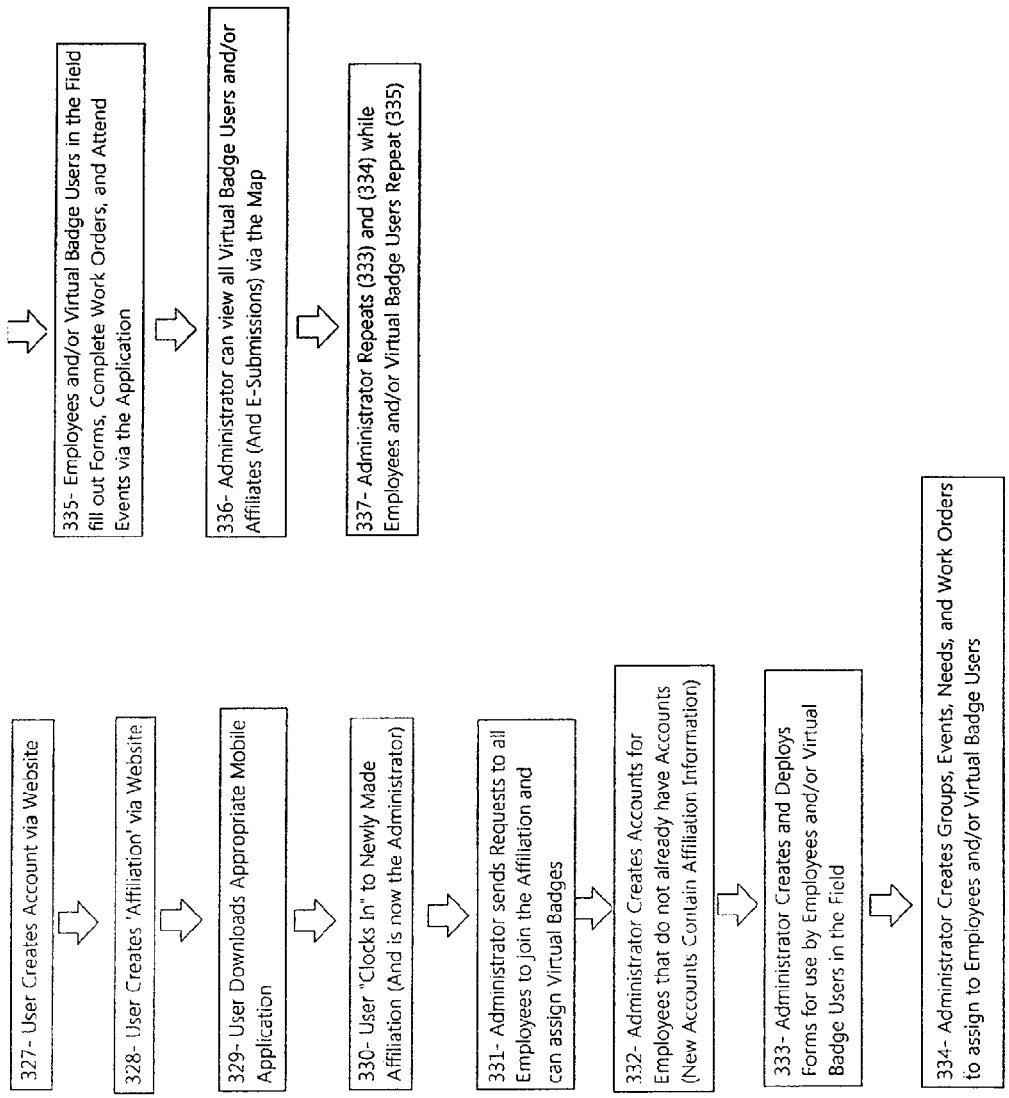
FIG. 12 is a flow diagram of the procedure utilized by a business and/or agency for workforce management.

FIG. 12 is a flow diagram illustrating how a cell phone or mobile communication device can be employed utilizing the present invention to manage a workforce using virtual badges. At step 327, the user, who will become the administrator, creates an account via a Website. Next, at 328, the user creates an "affiliation" via the Website. Then, at 329, the user downloads the appropriate application(s). Once these are installed, the user "clocks in" to the newly made affiliation and now becomes the administrator, at 330. Next, the administrator can send requests to all selected users and/or employees to join the affiliation at 331, and the administrator can assign virtual badges to selected individuals or users. Alternatively, mobile users can download the application to their device by a request to the administrator or by going to on line stores. The administrator then can create accounts for the user and/or employees that do not already have accounts at 332. These new accounts contain affiliation and registration information. The administrator may choose at any step to perform a desired background check, using a third party screening service. Then, the administrator can create and deploy custom forms for use by mobile users with the virtual badges in the field at 333. Next, the administrator can create groups, events, and work orders to assign to employees at 334. The mobile users in the field then fill out forms, complete work orders and attend events via the application at 335. The administrator can view all the affiliates, virtual badges and e-submissions via the map at 336 (recalling a Smart phone supervisor can view all of a group's users with the system). Finally, at 337, the administrator repeats steps 333 and 334, while the mobile users repeat step 335.

Figure 13:
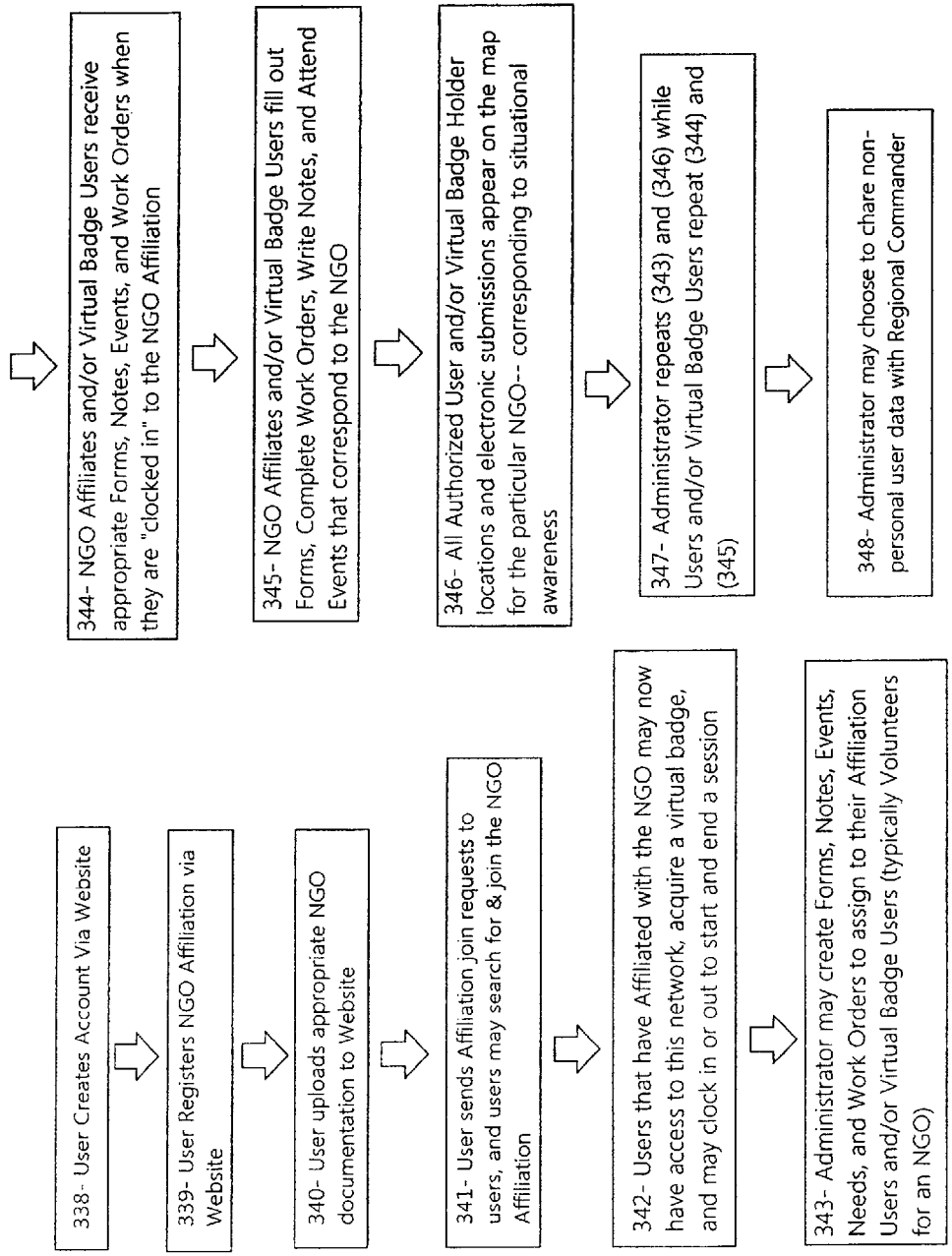
FIG. 13 is a flow diagram of the procedure utilized by a Non-Governmental organization for volunteer management.

FIG. 13 is a flow diagram illustrating non-governmental organization (NGO) volunteer management. First, at step 338, a user, who may become the administrator, creates an account via a Website. Next, the user registers the NGO affiliation via the Website at 339. Then, the user uploads appropriate NGO documents to the Website at 340. The user next sends join requests to specific users, or users may search for and join the NGO affiliation at 341. At 342, the users that have affiliated with the NGO may now have access to this network and may acquire a virtual badge, clock in or out to start and end a session. The administrator also may choose at any step to perform a desired background check, using a third party screening service. The administrator also may create forms, notes, events, needs, and work orders to assign to their affiliated users (typically volunteers for an NGO) at 343. Likewise, with the mobile user's completed skill sets and submitted certifications, the NGO may choose to Type the mobile user, using Incident Command System (ICS) typing guidelines. Each NGO may customize these Typing features to meet their agency needs, but with 5-7 Type levels, the NGO can far better pair skill sets of personnel with the needs of the specific tasks at hand. (This Typing feature is not limited to just volunteer operations covered in this subsection). Next, at 344 the NGO affiliates receive appropriate forms, notes, events, needs and work orders when they are "clocked in" to the NGO affiliation. Then, at 345, the NGO affiliates fill out forms, complete work orders, write notes and attend events that correspond to the NGO. At 346, all authorized user and/or virtual badge holder locations and electronic submissions appear on the map for the particular NGO, corresponding to situational awareness. Then at 347, the administrator repeats steps 343 and 346 while the users repeat steps 344 and 345. Finally, at 348, the administrator may choose to share non-personal user data with an Incident Commander (IC).

Figure 14:
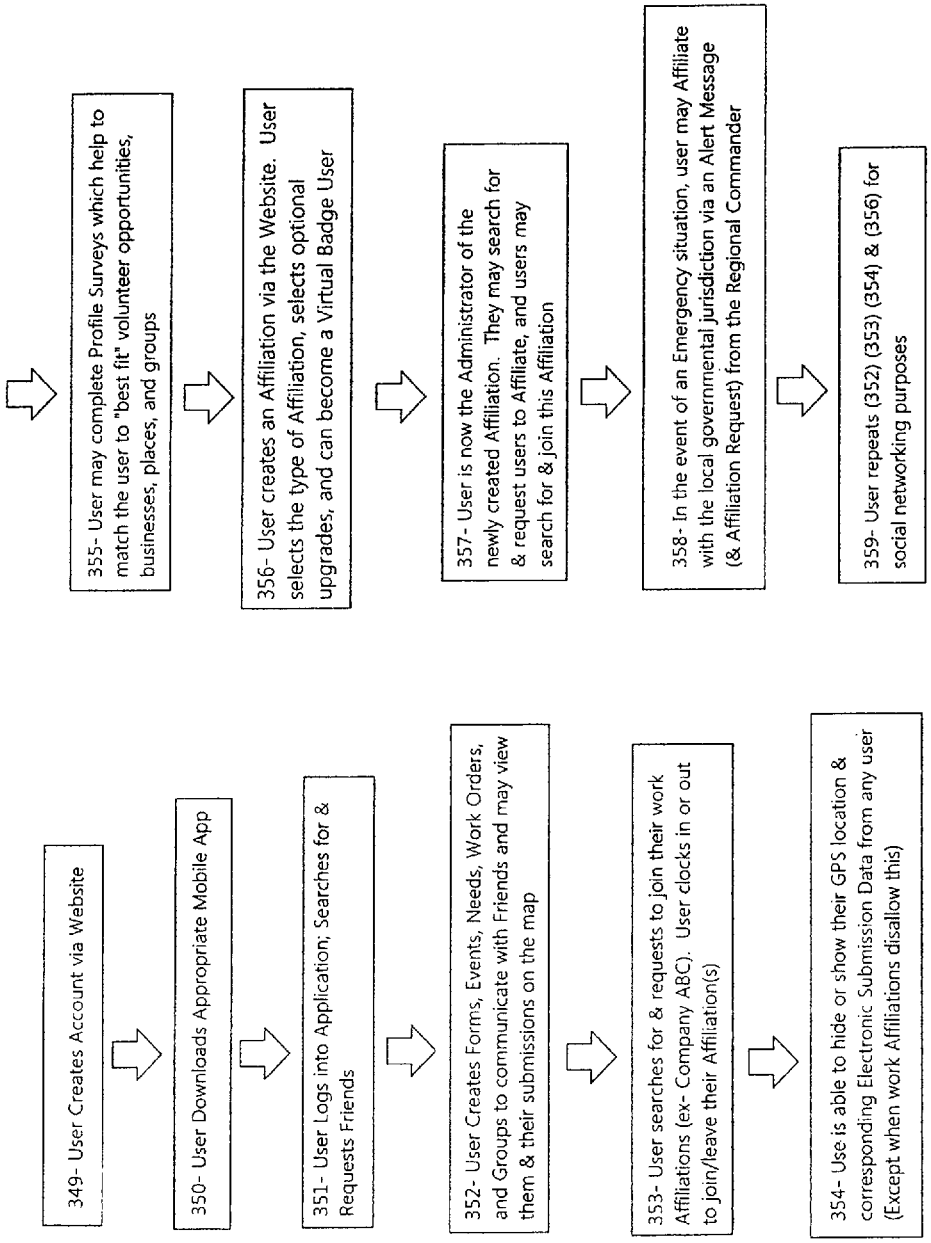
FIG. 14 is a flow diagram of the procedure utilized by an End-User for social networking and GPS tracking for event creation and management.

FIG. 14 is a flow diagram illustrating end user social networking. At step 349, a user creates an account at a Website. Then, at 350, the user downloads appropriate mobile application(s). Next, at 351, the user logs into the application and searches for and requests friends. Next, at 352, the user creates forms, events, needs, work orders, and groups to communicate with the friends and may view them and their submissions on the map. Then, at 353, the user searches for and requests to join their work affiliations (for example, company ABC). The user then clocks in or out to join or leave their affiliations. At 345, the user is able to hide or show their GPS location and corresponding electronic submission data from any user (except when work affiliations disallow this). Next, at 355, the user may complete profile surveys which help match the user to "best-fit" volunteer opportunities, businesses, places and groups. At 356, the user creates an affiliation via the Website. The user selects the type of affiliation and selects any optional upgrades. At 357, the user can become an administrator of the newly created affiliation, if authorized. Different administrative levels can allow for different levels of controls of the system itself Administrators may search for and request users to affiliate and users may search for and join this affiliation. Administrators also can track hours logged by mobile users as well as a host of other valuable field data. In the event of an emergency situation, the user may affiliate with local governmental jurisdiction via an alert message and affiliation request from the regional commander at 356. Finally, at 359, the user repeats steps 352, 353, 354, and 356 for social networking purposes.

The virtual badge system of the present invention can be employed to provide a functional and efficient database to serve as the repository for all information gathered in the field via the cell phone and/or device equipped with GPS and having GPS functions with BLUETOOTH® or other wireless technology. This database shall be separated into sectors based on user permission and user affiliations to other organizations contained inside the software. The system also may allow for a separate database storage system at a specifically desired location, like a user's normal offices.

The virtual badge system of the present invention can also provide the means for an authorized and affiliated Governmental entity (typically a County or Parish's Emergency Management Team) to control a disaster response operation via the cell phone equipped with GPS and having GPS functions with BLUETOOTH® or other wireless technology, which is interfaced with a web-based version of the cell phone software meant for administrative purposes. This affiliated Governmental entity (henceforth referred to as the "Regional Commander") may submit a mass-alert to authorized users that serves as an "opt-in" program to the particular disaster response operation. This ability (via the customized cell phone software) allows the Regional Commander to organize and task both his virtual badge users of responders and what would normally be spontaneous volunteers with no affiliation or tasking.

The virtual badge system of the invention allows users to create discrete groups, businesses, organizations, and affiliations via the cell phone equipped with GPS and having GPS functions with BLUETOOTH® or other wireless technology for the purpose of business management and user privacy. Groups, businesses, organizations, and affiliations are treated as discrete entities by utilizing the cell phone software that contains a private sector of the database that only authorized users may access. Users may "clock in" or "clock out", using the cell phone software, to enable or disable affiliation with a group, business, organization, or affiliation.

Organization tools are also available via the cell phone equipped with GPS and having GPS functions with Bluetooth® or other wireless technology, such that responders and users in the field can customize the organization of their virtual badge users. Users have the ability via the system and/or cell phone equipped with GPS and having GPS functions with BLUETOOTH® or other wireless technology to "drag and drop" user representations (in the cell phone or base's software) to assign them to organizations and groups, and in emergency management events, into chain of command charts for both paramilitary and military responses.

Inventory management related tools are also available via the cell phone equipped with GPS and having GPS functions with BLUETOOTH® or other wireless technology, such that responders and users in the field can easily create and maintain inventory lists for further reference. This generally applies to disaster environments, primarily for critical inventory management, but is applicable to non-disaster scenarios. In this embodiment, with a plug in module, the virtual badge may contain similar information to a person's identification data such as a photo, data, location, quantity, condition, clock in, clock out, timed maintenance required (like servicing a generator) or expiration schedule (like medications) of inventoried assets, and/or an image like a Bar or QR code linked of the inventoried equipment, all of which can be monitored, managed, and scanned as described herein.

The present invention can also provide a mobile credit card payment system and credit card payment gateway for mobile users to process payment via the cell phone equipped with GPS and having GPS functions with BLUETOOTH® or other wireless technology, for purchasing the virtual badge or for payment for jobs completed in the field. This mobile credit card payment system and credit card payment gateway can be implemented via pre-existing external attachments to the cell phone that allow for or by NFC or scanning technologies, including magnetic-strip cards to be read, interpreted, and processed for payment (via the customized cell phone software, credit card payment gateway, and/or database).

The present invention can also provide privacy controls via the cell phone equipped with GPS and having GPS functions with BLUETOOTH® or other wireless technology for the purpose of allowing virtual badge users in non-disaster purposes the ability to "hide" their location and information submitted from other discrete users, groups, businesses, organizations, or affiliations (subject to an administrator's approval). The nature of GPS tracking necessitates that privacy controls be implemented via the customized cell phone software in order for the invention to be viable on a day-to-day basis. It is yet a further objective of the invention to provide the user easy means via the cell phone equipped with GPS and having GPS functions with BLUETOOTH® or other wireless technology to change settings in the cell phone software related to user Profile Information, GPS & Locations Settings, BLUETOOTH® Synchronization, Wi-Fi Synchronization, and privacy controls. All of these settings change settings in the cell phone software. This can be accomplished by pre-programming a single "push button" on a cell phone or device to perform all of these functions when activated.

The present invention also provides a system and method for identifying or classifying members of a team of virtual badge users based on their knowledge, skills and abilities to perform particular functions. The members of the team can be career responders or volunteers. The members of the response team are preferably identified or classified into "Types" based on completion of FEMA sponsored National Incident Management System (NIMS) instructional and command-oriented classes, based on previous disaster response experience, or based on defined parameters by the system of the present invention. Each "Type" can have sub-categories. The following six "Types" are a preferred embodiment, though additional "Types" are also possible:

Type VI—non-registered applicants and/or responders.

Type V—Entry level. Inexperienced and untrained. Has photo identification. Has signed an application, release, and handbook.

Type IV—Inexperienced with some training. Has completed a criminal background check. Completed NIMS courses IS-100.a and IS-700.a. Completion of orientation. Has photo identification. Has signed application, release, and handbook.

Type III—Inexperienced with some command training. Has completion of criminal background check. Completed NIMS courses IS-100.a, IS-200.a, and IS-700.a. Basic first aid and CPR knowledge. Completion of orientation. Has photo identification. Has signed application, release, and handbook.

Type II—Some experience with full command training. Has completion of criminal background check. Completed NIMS courses IS-100.a, IS-200.a, ICS-300, IS-700.a, and IS-800.b. First aid and CPR knowledge. Completion of orientation. Has photo identification. Has signed application, release, and handbook.

Type I—Extensive experience with full command training. Has completion of criminal background check. Completed NIMS courses IS-100.a, IS-200.a, ICS-300, ICS-400, IS-700.a, and IS-800.b. First aid and CPR knowledge. Completion of orientation. Verifiable field experience. Has photo identification. Has signed application, release, and handbook.

Software contained within the cell phones or on the web-based version can sort the virtual badge users based on the above noted criteria, using matching logic or manually matching their skills and talents with the needs of an organization to accomplish a job or task. The virtual badge users can upload their National Incident Management System (NIMS) or other course certificates via a portal on the software's website or upload said documents using the cell phone software. The courses can be verified by an administrator and entered into the system via the server-side database of the software system. This updates the system to sort and "Type" the individuals or volunteers, as well as to assist with assigning appropriate tasks to appropriately qualified virtual badge users. The system can be designed to send an alert to a supervisor or administrator if a virtual badge user's certificates have expired or are inadequate for a task. For example, in working an oil spill, a virtual badge user may need a HazMat course, and if a virtual badge user were inappropriately selected for a task, an alert could be automatically sent to the administrator advising of this inadequate level of certification of that user for that task.

The invention also provides the user with tools for integration with existing software, via software APIs, such that the data collected via the cell phone software system may be exported and integrated for additional disaster response uses, reporting, analytical, or business development purposes.

The present invention further enables 2-way satellite communication via cell phones and satellite devices that transmit data through the satellite network as opposed to through cellular signal. These devices can permit the virtual badge user to be "online" at all times, even when the device is disconnected from cell service, and will aid in disaster operations.

The present invention also involves a process wherein a small crew and/or family unit with the virtual badge software could set user-defined administrative settings which restrict or allow selective GPS visibility in the mobile and/or desktop software application. These user-defined administrative settings should allow for user data in the form of geo-tagged photos, events, forms, tasks, and locations to be encrypted in the mobile and/or desktop software application before this data is sent to the server. As per this technical process, only authorized users' mobile and/or desktop applications possess the corresponding private key to decrypt this data. For further safety and security, additional administrative settings allowing remote access to the handset may be enabled. These additional administrative settings include but are not limited to: turning on the handset microphone, either forward or backward facing cameras, and browsing history. This invention therefore has administrative settings that can be enabled or disabled in certain builds of the application. These administrative settings further encrypt locations in the application and help ensure safety. This process allows very strict monitoring of a small crew or family unit of virtual badge users by an administrator within a protected silo.

Figure 15:
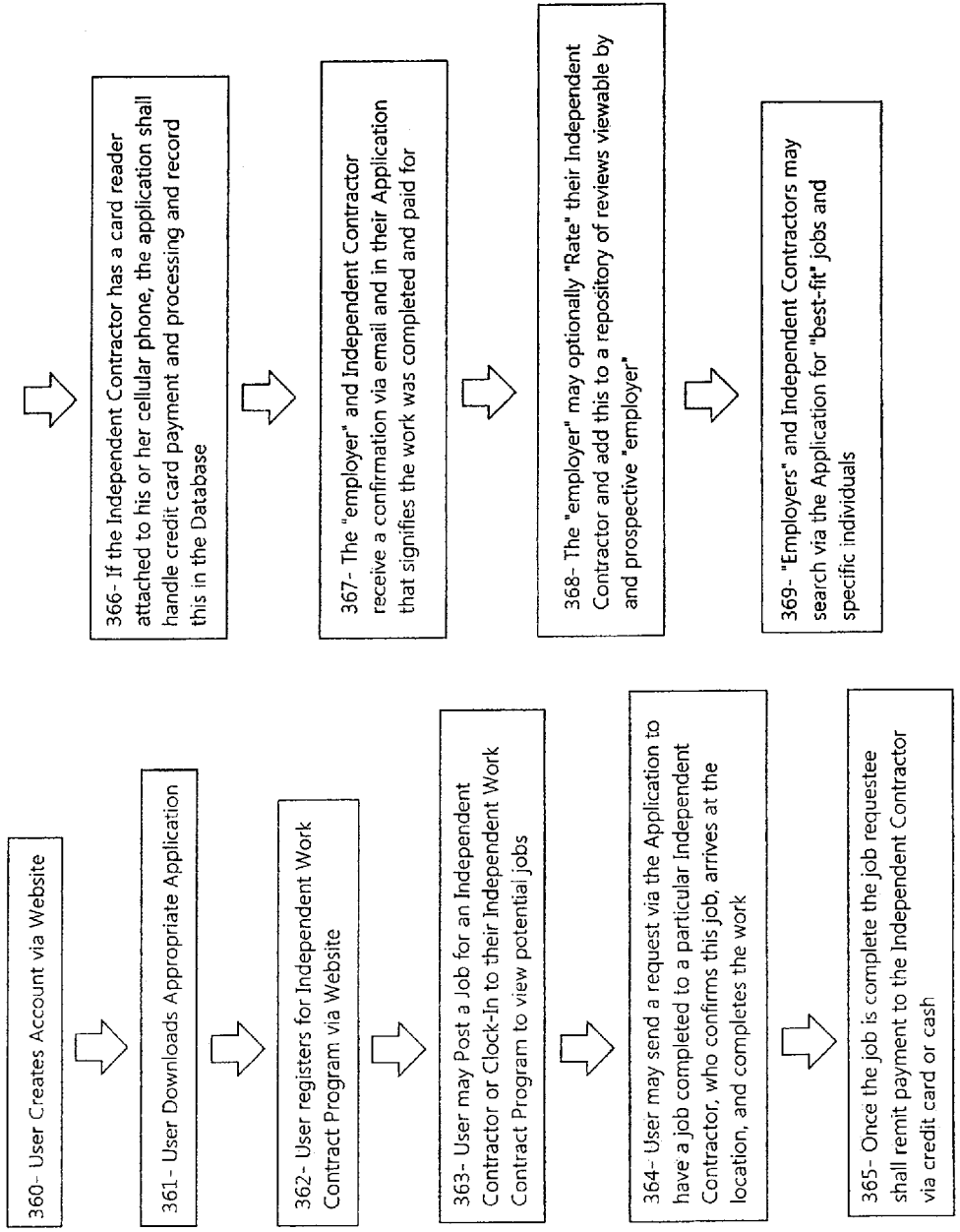
FIG. 15 is a flow diagram of the procedure following a disaster utilized by a contractor and/or potential employer to post jobs, find jobs, complete jobs, and have payment processed for jobs.

FIG. 15 is a flow diagram illustrating work contracts and jobs, like for example, debris haulers (or other contractor). At step 360 a user creates account(s) via a Website. At 361, the user downloads the appropriate application(s). Next, at 362, the user registers for the work contract program via a Website. The user can now post a job for a contractor or "clock in" to their work contract program to view potential jobs, at 363. Next, at 364, the user may send a request via the application to have a job completed to a particular contractor, who confirms this job, arrives at the location, and completes the work. Once the job is complete, the job requester can remit payment to the contractor via credit card or cash at 365. If the contractor has a card reader attached to his cellular phone, the application can handle the credit card payment and processing and record them in a database at 366. Next at 367, the "employer" and contractor receive a confirmation via e-mail, and in their application, that signifies that the work was completed and paid for. At step 368, the "employer" may optionally "rate" their contractor and add to a repository of reviews viewable by any prospective "employer". Finally, at step 369, the "employers" and contractors may search via the application for "best-fit" jobs and specific individuals using the system's matching logic features.

FIG. 16 illustrates a flow diagram demonstrating how an Incident Commander (IC) can gain access to various areas and information. First, at step 370, a governmental entity creates an account via a Website. Then, at 371, the governmental entity applies for an Incident Commander license. Upon receipt of the license, a new database sector in a government only server is created at 372. Next, at 373, a "Jurisdiction" is created and an assignment of geographical areas and user geographic affiliation to the IC account occurs. Then the IC has access to non-personal statistical information about all authorized users in the jurisdiction at 374. In the event of an emergency, the IC can send a mass alert message (affiliation request) via the application to all authorized users and/or virtual badge holders in the jurisdiction at 375. Users who have opted into the emergency response are now affiliated with the IC and may now be assigned forms, work orders, notes, tasks, events, and needs for the purpose of disaster response at step 376. All data submitted by IC affiliated users is sent only to the appropriate governmental database sector at 377. Then, at 378, upon conclusion of the emergency response, all affiliated users lose their affiliation and may not renew their affiliation unless another mass alert (join request) is sent by the IC. Finally, at 379, all data submitted via the emergency response is available to the IC to share with other sources via APIs and is available for analytical purposes. The data submitted during the emergency response is logged into a selected database and does not automatically delete after a certain period of time.

Figure 17:
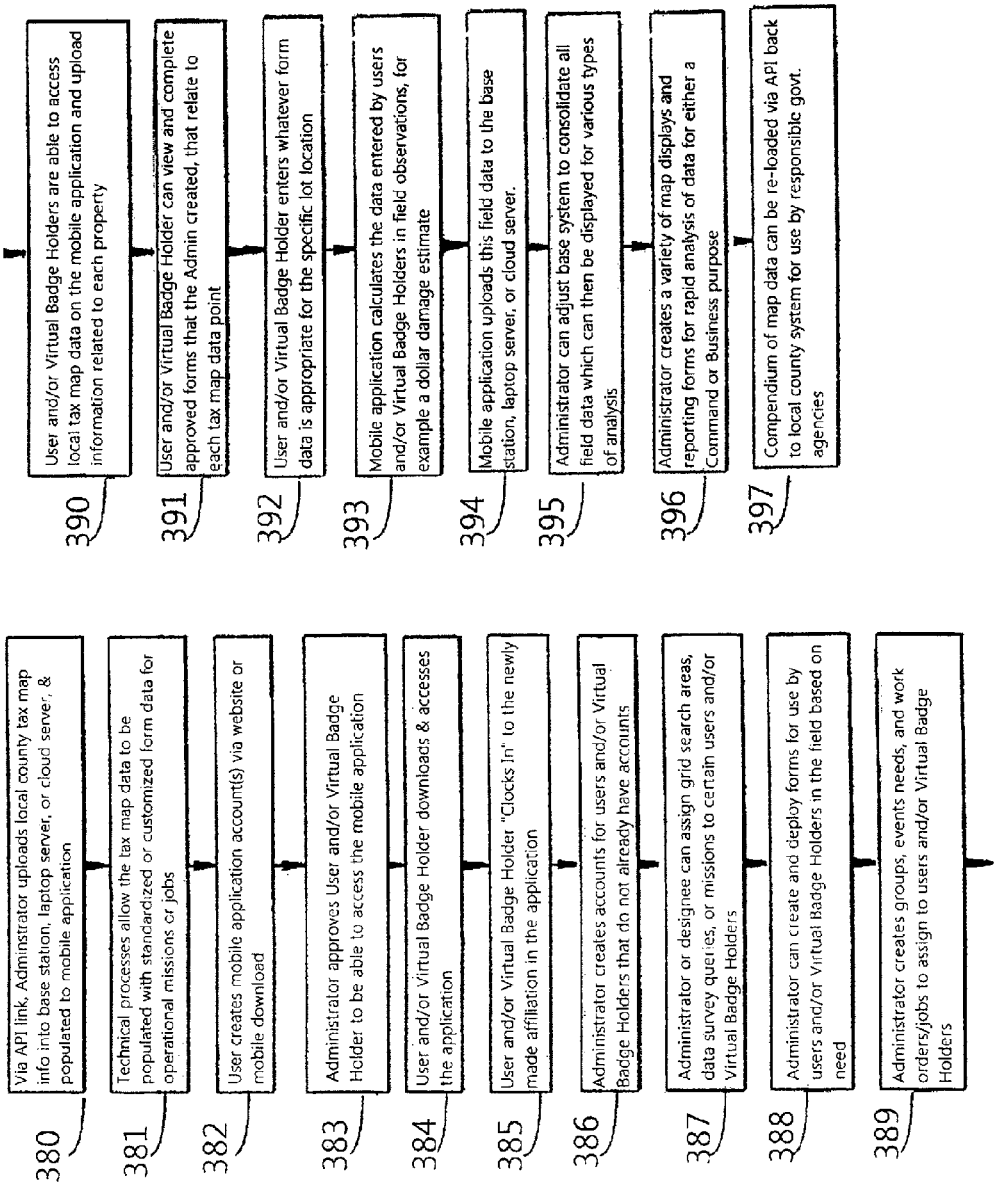
FIG. 17 is a flow diagram of the procedure for GPS enabled software to interact with a software to upload public data.

FIG. 17 is a flow diagram illustrating a process or method on the GPS enabled phone software interacting with the software system and uploaded, local, publicly stored government data such as a local tax assessor's data information base merged into the system via an API link. Such tax data bases contain individual lot I.D. numbers, lot sizes, owner's names, addresses, contact information, often detailed floor plans, valuations, zoning, building permit information, construction history, etc. Such tax maps also can reveal critical infrastructure details and locations as well. Step 380 illustrates an upload via an API link of the local county tax data base into a secondary or remote third party independent data storage device such as the base station, laptop server, or cloud server such that this information then can be populated into the map in the mobile and/or desktop software application. Step 381 is when the technical process allows these map points to be populated with standardized or customized form data and tasked to users for operational missions or jobs. At step 382, a user creates account(s) via a Website; and at Step 383, the Administrator needs to approve the virtual badge holder to allow access to the mobile app. At 384, the virtual badge holder downloads the appropriate application(s), and at Step 385, the virtual badge holder "Clocks In" to the newly made affiliation. Step 386 shows the Administrator creating an account for virtual badge holders that do not already have accounts. At Step 387, the Administrator or his designee can assign certain grid search areas or data survey queries to certain virtual badge holders and/or teams. The Administrator can create and deploy forms for use by virtual badge holder and/or responders in the field at Step 388 based on the needs. Step 389 shows the Administrator creating groups, events, needs, and work orders to assign to virtual badge holders. At Step 390, virtual badge holders are be able to access the consolidated mobile mapping and local tax data on any specific lot by uploading the specific point within an illustrated set of lot lines via a touch screen on the phone. Every lot on the mobile map can have such a touch point to allow the user to pull up the background, detailed data. With the mobile application now revealing the lot's designated data at Step 391, the virtual badge holder can view the Administrator's choice of field viewable data, which will contain form fields with either fill in options or drop down options to rapidly collect GPS field data about that lot. Step 392 illustrates the virtual badge holder entering whatever from data or selecting an appropriate drop down option as may be appropriate for that lot location. Step 393 illustrates the virtual badge holder's mobile application calculating the data entered by these field observations. One example of an input could include the mobile user's observations of the percentage of damage to the structure, which can be numerically entered into the form field or by selecting an appropriate drop down option, where the GPS enabled mobile application can note the GPS coordinates, the time and date of the entry, and the user ID number for subsequent accountability. The virtual badge holder also has the option of taking photos of the lot, which photos are tied to the form and its data. By entering a number or a drop down, pre-scripted, percentage of observed damage, the GPS enabled phone software can auto-calculate the actual dollar damage estimate, based on the local tax assessor's valuation and/or based upon the user's inputted field observations. After auto-calculating the damage observed, a color code can be associated with a predetermined damage valuation or other needs at GPS location. Color codes can be displayed on a map whereby damage to a location and/or resources needed to address the specific damage, need, or assistance to an area can be determined. Additionally, the color codes can be displayed on a mobile user's software application on their phone, a web application, or combination thereof. On viewing a host of such locations on a map, color codes, and especially groups of similar colors, a virtual badge holder readily could identify areas of need or areas with little needs. Patterns based on such group color codings could lead to quicker evaluations and more efficient responses. Data from the virtual badge holder's software or software application can also be transferred to a remote storage device, such as the base station, laptop server, or cloud server as described above. A designated color code also can be auto-assigned to each lot ahead of sending users out for assessments, based on the Administrator's tasking. For example, the base station, laptop server, and/or cloud server may auto-calculate and/or analyze impacts and needs to pre-defined geographic areas, with views of groups of color codes as described above. Step 394 documents the mobile application uploading its field data back into the base station, laptop server, or cloud server. At Step 395, the Administrator can adjust the base system to consolidate all of the field data into the system's data base which can then be queried for any and all of the geotagged and time date stamped data gathered from a host of users to analyze a variety of impacts to a local community. At Step 396, the Administrator can create a variety of map displays, color coded and data driven, reporting forms like ICS 209 forms, graphic and tabular displays—all for rapid analysis of large amounts of data into simplistic displays for either a Command or business application. The Administrator also could choose to display miniature thumbnail photos on the base maps, with the photos each bordered by the same chosen color codes to again quickly reveal patterns of lot assessments. Step 397 illustrates how this compendium of map data can then be re-loaded via an API back into the local county system for use by a host of responsible government agencies. Step 397 illustrates how the Administrator can repeat Steps 387, 388, 395-397, while the virtual badge holder can repeat Steps 389-394 as needed.

In yet another use of a variation of FIG. 17, a local government could use the same displayed methods for training, which training can integrate with on-going research in a community. For example, if teams were receiving training on the software system, forms could be created which can survey data collection by students in the field. By targeting a certain low income community for such a training zone, a class could collect housing data such as the age and type of roofing, storm hardened windows, obvious code enforcement issues. As a result of such a survey, the local government then could use the field collected data for grant application, like block grant funding from the federal government, to prove for the grant application that there is indeed a justified need for the grant monies to support. Similar data could be pre-scripted into forms for such trainings on door to door surveys of local populations as well, with invaluable data for collecting unmet needs, local trends, and research for university studies. Once again, this system used in these examples meets FEMA's Whole Community approach to developing such systems, and more day to day use like described herein offers viable uses for training opportunities for a wealth of development programs as well.

Figure 18:
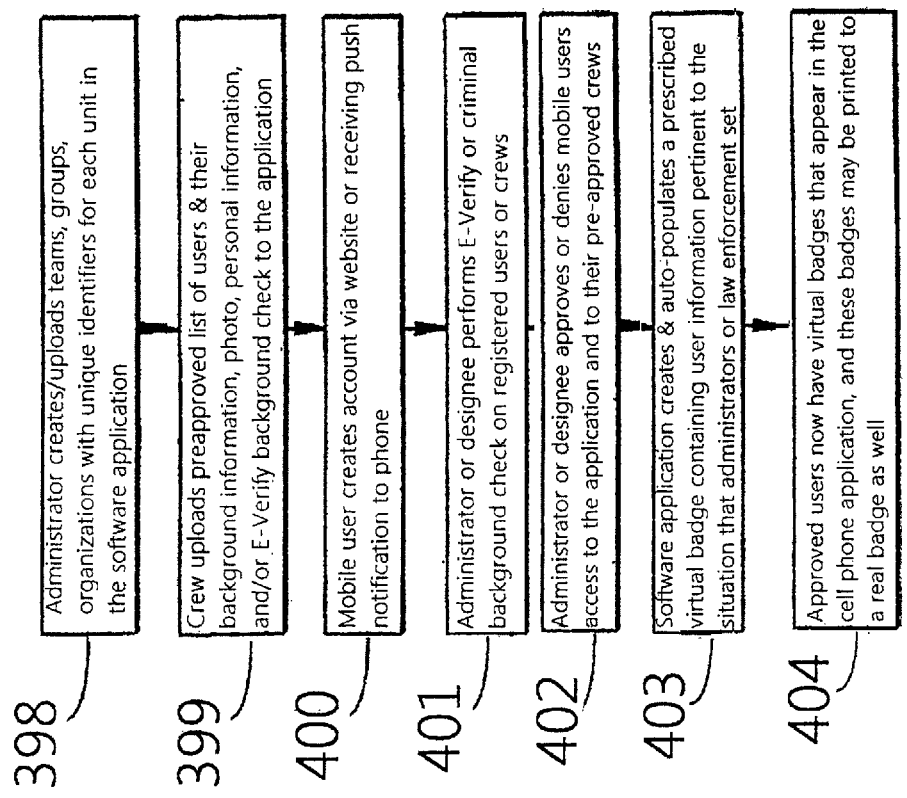
FIG. 18 is a flow diagram wherein a screen or view of a handset contains a virtual "badge" or identification.
Figure 20:
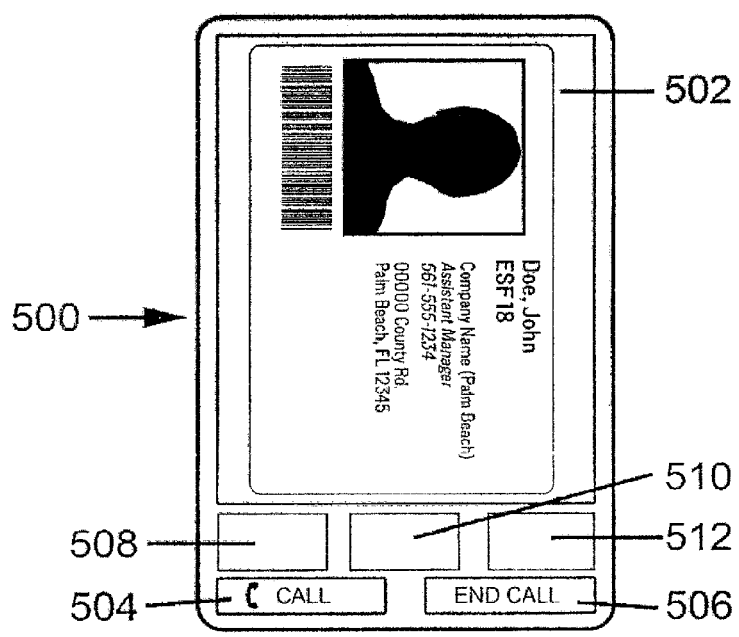
FIG. 20 is an illustrative example of a cell phone with the virtual badge.

FIG. 18 describes an illustrative process or method wherein a certain screen or view of the handset application contains the virtual badge. At Step 398, an Administrator creates or uploads teams, groups, volunteer organizations, and/or local businesses plus their employees (collectively referred to as "a crew") with unique identifiers for each unit. As an illustrative example, for temporary access following a disaster or other emergency or for normal day to day access, Step 398 could be used to upload information relating to a resident (or one of his/her staff members) of a barrier island community or other neighborhood, including the address to which those users are allowed access. Other uses include, but are not limited to providing citizens with temporary access to gated communities or privately restricted areas, monitoring cruise ship passengers entering and exiting the ship, monitoring visitors to public buildings, armed services facilities, volunteers responding to disasters, and/or institutions. Step 399 illustrates how each crew uploads its own pre-approved list of virtual badge users. As an illustrative example, a response crew could upload its crew of users. Alternatively, a homeowner on a barrier island or other neighborhood could perform this Step, if allowed by the Administrator. The upload process would include adequate details of background information to allow proper identification, such as a photo of the user, a name, date of birth, address, and/or social security numbers (enough information for instance of an E-verify background check to confirm the user is a legal resident allowed to work in the United States or for a simple "wants and warrants" check by a local law enforcement agency, all subject to the Administrator's discretion). Step 400 illustrates a mobile user creating an account via a Website seeking a link to a designated crew, or other entity, or the user could receive a push notice via the mobile phone from the Administrator. At Step 401, the Administrator or his designee can perform an E-Verify background check or criminal background check, or other type of check, as may be desired. Step 402 shows the Administrator then needs to approve linking the virtual badge user to a pre-approved crew and/or home site and/or business location to allow access to the virtual badge holder and merge that user's data with its designated crew, home site, or business location in the application's database. The Administrator could push the virtual badge to the designated mobile device via the cellular network or via Bluetooth® or other means as needed. At Step 403, the software system then auto-populates a prescribed virtual badge on the mobile device containing user information pertinent to the situation, as illustrated in FIG. 20, such as a photo, logos, a name, social security number, gender, age, skill set, credentials, blood type, etc., along with its unique bar code or QR code image which may contain the same data or more, as determined by the Administrator. This virtual badge may also be color coded, (see FIG. 21 where the shaded 534 region is colored in for example red, blue, yellow, orange), corresponding to any information an administrator, like ESF-16—law enforcement and security, or authorized designee sets. Alternatively, or in addition to the color coded region, other counter measures to counterfeiting such as the use of logos, symbols, security clearance levels, or words added to the background, watermarks, images, or combinations thereof, and programmed to change based on one or more factors, such as code commands or varying, specified, time periods. At Step 404, the now approved user has an approved virtual badge that can be displayed from his cell phone application.

Figure 19:
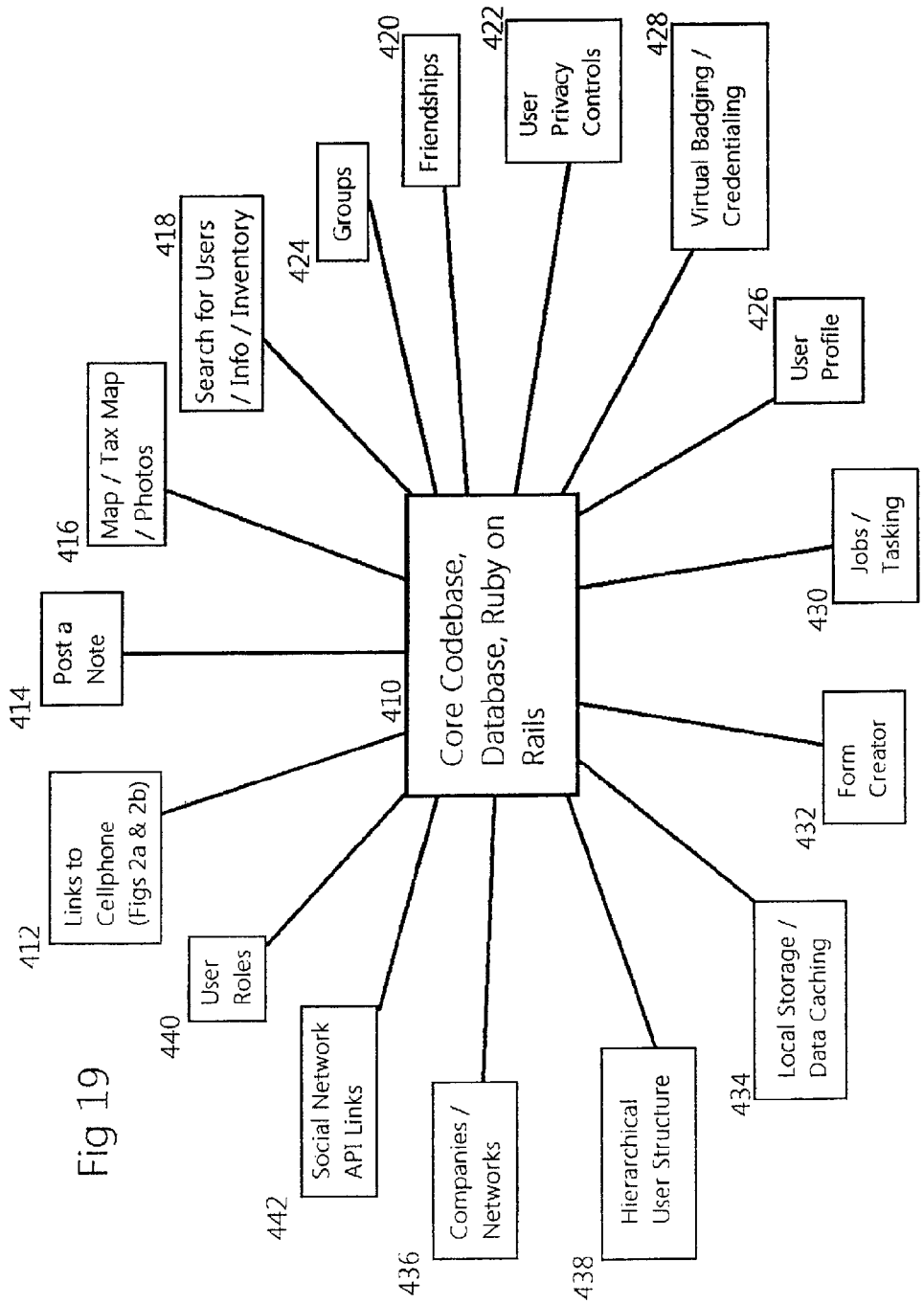
FIG. 19 is a block diagram of the component associated with the functions of FIGS. 17 and 18.

FIG. 19 is a block diagram of the components of the software system processor with a sample of the software's plug in modules. The core component of the system is the database or core code base 410. Links to a cell phone are illustrated at 412. A post a note function is shown at 414. Local tax maps, maps and photographs can be associated with the database 410 at 416. A search for users, an asset inventory, or other information takes place at 418. Friendships are associated with the database at 420 and user privacy controls which can control access to the friendships take place at 422. Groups are associated with the database 424. A user profile is established at 426. Badging and credentialing is associated with specific users at 428. Jobs and tasks which are required to be performed are associated with the data base at 430. A form creator is associated with the database at 432. Local storage and caching takes place at 434. Companies and networks are connected to the database at 436. A hierarchical user structure for the database is established at 438. User roles are established at 440. Network API links and/or social network links are provided at 442.

Referring to FIG. 20, a cell phone 500 with an illustrative embodiment of a virtual badge 502 is shown. The virtual badge may be shown while still allowing the user the capability of using the cell phone, such as making calls 504, ending calls 506, or applications for web-browsing 508, texting 510, or gaming 512.

Figure 21:
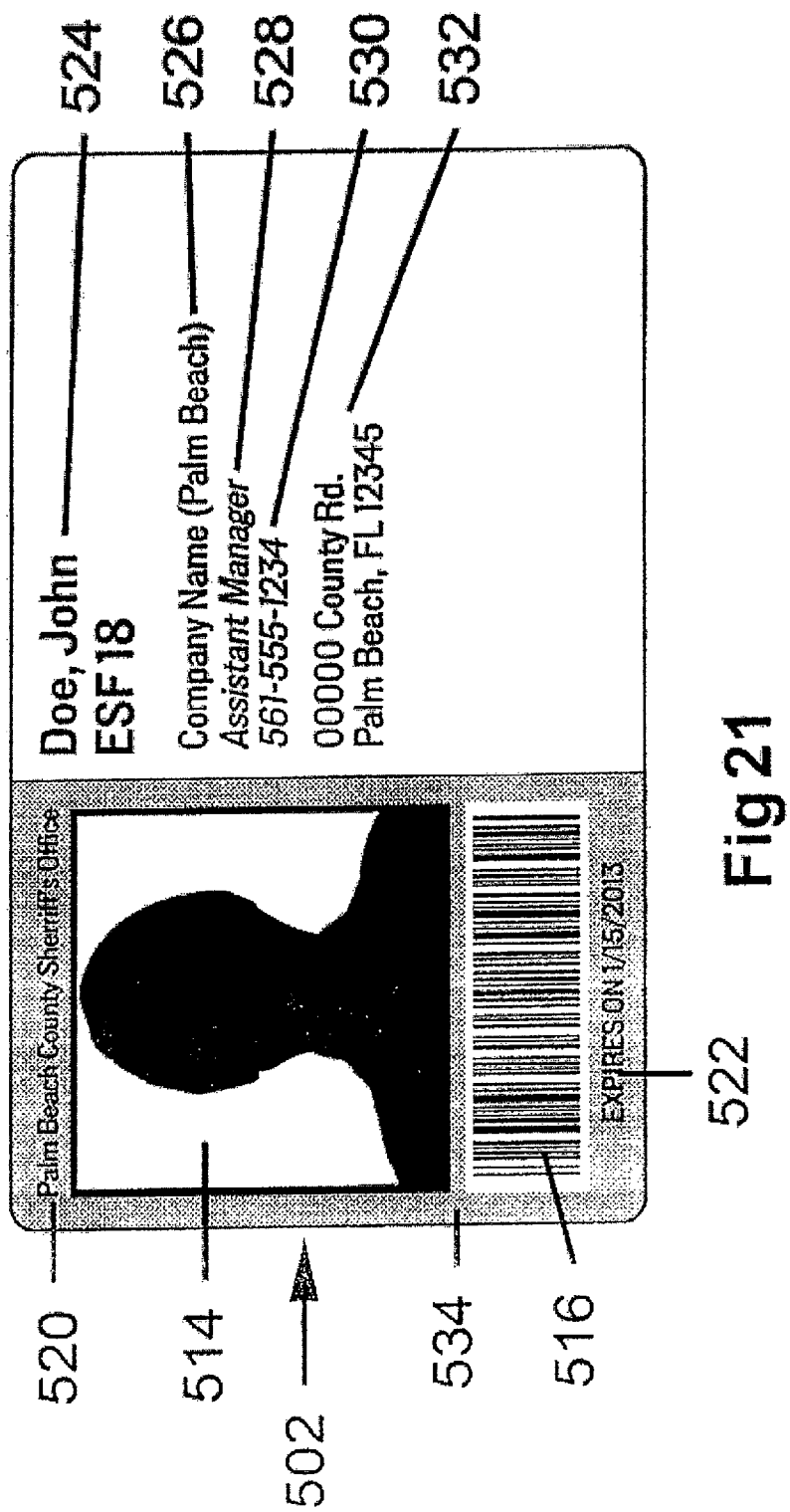
FIG. 21 is an illustrative embodiment of the virtual badge in accordance with the present invention.

Referring to FIG. 21, an illustrative embodiment of the virtual badge 502 as illustrated in FIG. 20 is shown. The virtual badge in the phone 500, or a handset, can be designed and programmed to be functional by displaying fixed data or data that can be changed, include a variety of information such as an image 514, a picture of the individual, a barcode or QR code 516 (provides for additional functionality) which contains the same and/or additional data about the user and which can be scanned for that data on the image via another cell phone with scanning technology or any other scanning technology, such as barcode or QR code readers. This virtual badge concept in this figure can be applied to both Smart phones and Feature phones alike. In addition to the photo images, or as part of being Federal Information Processing Standard (FIPS) Compliant, the virtual badge 500 may include details like the badge's issuing agency name 520, expiration date 522, as well as other text based identification, such as name of the individual 524, company identification 526, title 528, and phone number 530. In addition to or if the person with the visual badge is an individual, the address of the location the individual is allowed access to or the address at which the individual resides 532 can be included. Such information is for illustrative purposes only and is not meant to be limiting; whatever other information or FIPS standards may be imposed can be included in the badge.

Figure 22:
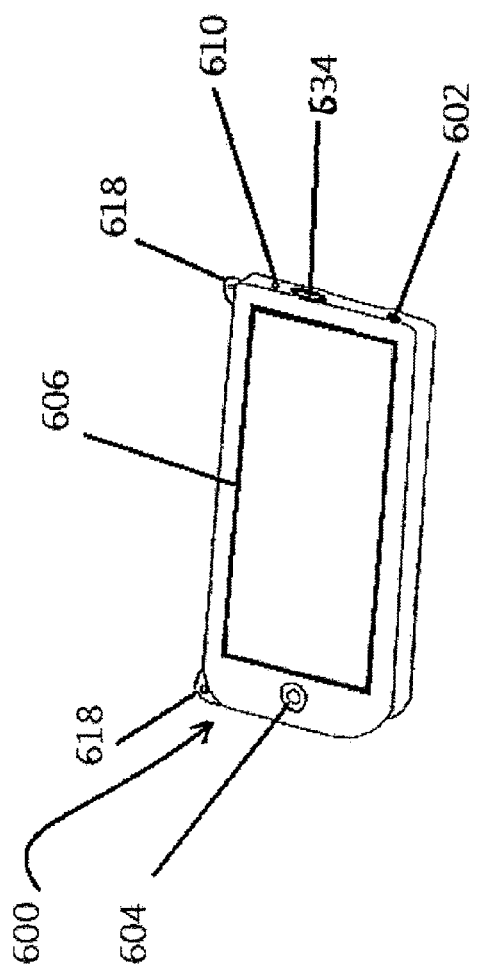
FIG. 22 is a perspective view of the virtual badge according to a preferred embodiment of the present invention.

FIG. 22 refers to an illustrative embodiment of the virtual badge on a separate electronic display device 600. The electronic display device 600 is preferably designed to be portable, small, lightweight, and inexpensive to manufacture. This device may be either linked to a cell phone via wireless technology or it can function independent of a cell phone, linked to a local Wi Fi network, which is able to monitor the virtual badge device just like described for the cell phone virtual badge, within that Mesh Network, as an example. The device is power cycled by holding down the control button at 602. Once the sync/control button at 604 is activated by holding down the button, the device will sync wirelessly to a designated cell phone or to a WiFi network as shown at FIG. 26. At that time, a digital passcode is displayed on the device's screen 606. The cell phone user, a laptop server, or an administrative server can enter in the passcode to sync to that specific device. Once the user is authorized to sync with the device or WiFi network, either the administrator will transmit the user's virtual badge data, photos, and images into the cell phone and/or into the device itself wirelessly, with the new data, photos, and images now stored within the device's memory at 608.

Figure 24:
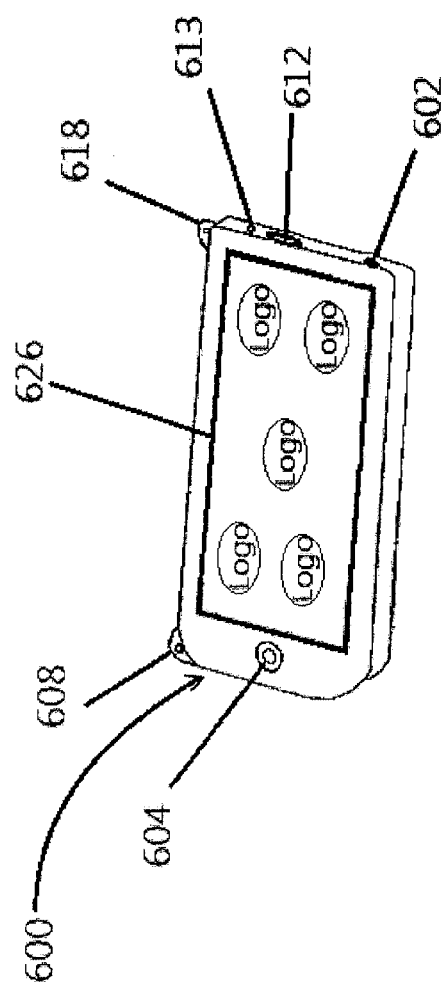
FIG. 24 is a perspective view of the virtual badge displaying a sample of one potential custom view of a sample badge with various logos.
Figure 25:
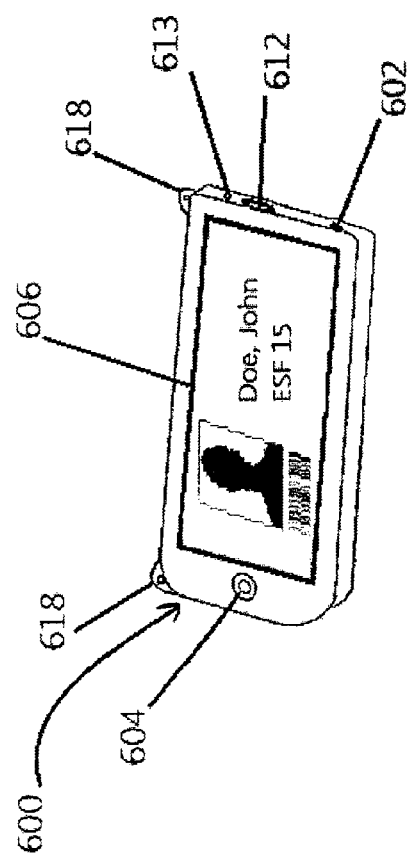
FIG. 25 is a second view of the virtual badge displaying a second sample of a second potential custom view of a sample badge with illustrative identification information.

The electronic display device 600 includes alternate power sources like a rechargeable battery pack 610, a USB port 612 to recharge the battery and/or synch to a separate computing device, a power adapter 613 to recharge the battery and/or directly power the device, and a control unit including a circuit board at 614, such as a printed circuit board and/or a microcontroller with memory capacity to store limited amounts of data, including images and/or photos, see FIG. 25. The electronic device also includes the necessary associated circuitry at 616 to electrically couple to the display screen 606, such as an LCD screen. The electronic display device 600 could be worn by the user, hanging from a lanyard with clips like at 618, see FIG. 24, similar to plastic badges. For additional tracking features, this lightweight electronic display device 600 also could contain an RFID or NFC chip 620, if the Administrator so desired. The device could utilize the sync/control button 604 to manually view various screens at by pressing the button (or a scroll screen as pricing for such alternatives may become affordable for this embodiment). The power button 602 powers up or down the display device 600, which button could recall the unit from a sleep mode, wherein the unit automatically transitions into a power saving mode, which time span may be pre-set by the Administrator. This device could be linked to the user's own cell phone, whereby the virtual badge data and images could be transferred by Bluetooth® or Wi Fi link from the phone to the device. Using this method, the user's phone could be carried in its case, while the inexpensive device is hung from a lanyard so that other personnel can view the badge in the separate device.

The virtual badge displayed on the display units such as the phone as described previously could also be linked to the electronic display device 600 so that the image is displayed on the screen 606 via BLUETOOTH® or other wireless technology. In this manner, the electronic device 600 connects to WI-FI or Mesh-WIFi network and receives the virtual badge information relating to the user through a router 624, see FIG. 26. The electronic display device 600 also connects to the user's cell phone 626, which transfers the virtual badge info via wireless technology form the phone 624 to the electronic display device 600.

Figure 23:
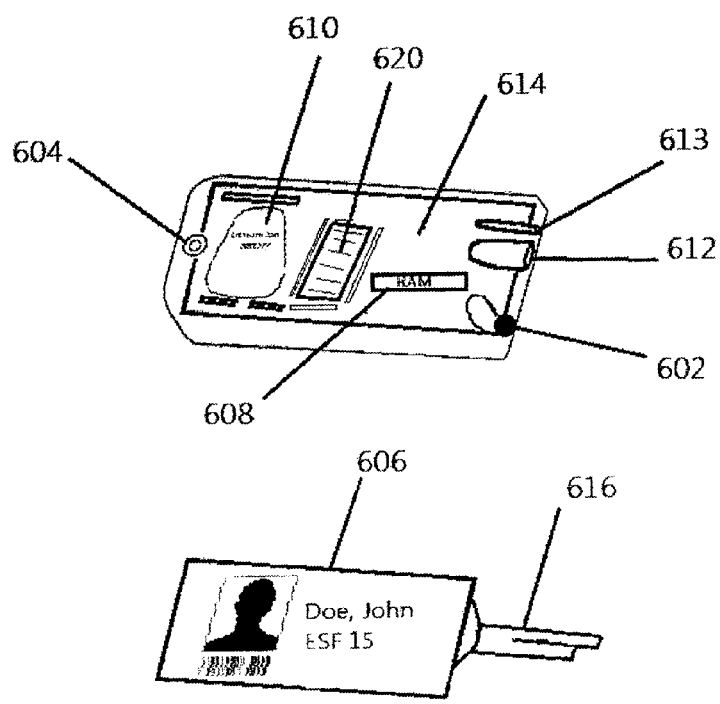
FIG. 23 shows the components of the virtual badge illustrated in FIG. 21 or FIG. 22.

At a checkpoint where a visible inspection may be needed, the virtual badge information would be stored on the device shown at FIGS. 22 and 23. By using the power button at 602, the security person could activate the device from its "sleep mode" into a "read mode" to allow a full view of the data displayed on the LCD screen at 606. By using the control button at 604, the security person could scroll through various screens of data on its LCD screen such as the logo screen 626, see FIG. 24, to verify the appropriate issuing agencies, and then scroll the screen display to show the user's personal identification data such as in FIG. 25. After scanning the virtual badge as described above, on a pre-set and adjustable interval, the device would return to its "sleep mode" to conserve the battery after a pre-set time period.

As another feature in the device, when it is in sleep mode, the device can be programmed to display in large block letters a user's identification, like his or her first name or a shape or color. The LCD screen, in its sleep mode, would have adequate back lighting to display just the basic block letters so that passer by personnel might readily identify the user and thus also authenticate that the user is in the appropriate section of the secure area or facility.

Alternatively, the device could be worn by a user and linked to a Wi Fi mesh network within a facility or say, for example, a ship. Using this method, the device contains the same data and information as described above and illustrated in FIG. 21, but in this instance, no cell phone is needed. The user still may be tracked via the RFID or NFC or other chip at 535 in the device when the user passes through pre-assigned check points with readers in place.

FIG. 27 displays a chart where a user and/or business owner registers information, and then say, for example, trucker drivers or responders coming from around the country into a disaster area or guests traveling from afar to visit servicemen in a foreign or domestic military base could apply for virtual badge. The applicant/user could register through a web portal either their own personal information or employee information at 543. This registration method could incorporate a user fee to be split between various agencies. The administrator then could screen the applicant/user(s) at 544, like at 401 in FIG. 18. This screening may or may not include various levels of criminal background checks to account for various clearance levels. Once approved, the driver, individual, business, resident, or serviceman is registered. For a business or resident seeking approvals for employees and/or house staff, the business or homeowner then would enter requested data, images, and/or photos through the administrator's web portal for a secondary approval for badges for their respective employees or staff like at 544. A serviceman likewise could request a badge for his family or friends to access the base this way. The user then may request to purchase or obtain virtual badge at 546. At 547, like at 403, the administrator can customize and/or change the desired virtual badge for different access protocols for various levels of badges, programmed timed color changes of the badge, bar code or QR code styles, image data contents, various logos, photo placement, and/or pre-set self-destruct schedules. At 548 like at 402, the administrator approves or denies the request following a payment, if needed, for the virtual badge license(s). Authorized users then receive either an email or text SMS with instructions on how to download with an appropriate log in credential at 549. The virtual badge then can display on the user's phone screen and/or the synced device's screen 606. Finally, the self-destruct "timer" within the virtual badge causes the badge to self-destruct and become reusable, unless a new payment or re-authorization is processed by the administrator/agency at 550.

FIG. 27 also displays a method of securing an approved virtual badge and could coincide with a user in a disaster checking in to an area and signing into to an ICS Form 211. Using the system outlined in this application, the registration could be automated and auto-loaded into the ICS 211. With the virtual badge data, an administrator could more quickly organize crews and personnel by the qualification data which might be collected as part of the virtual badge registration. Colors could be assigned to Type these personnel, again to facilitate organization of personnel. If the virtual badge was loaded into an ICS 211 in an Excel format, which may include a photo of the virtual badge user, each badge on the ICS 211 could be designed to change colors, say from green to red, to display when that user is active. This system upgrade could add to accountability for logging in and logging out on the ICS 211.

Once loaded into an ICS 211 in a format like Excel, the virtual badge with a possible added unique identifier like the user's phone number's last four digits, could be used in other ways to facilitate filling in ICS forms during an incident. Using copy and paste or drag and drop methods, an administrator could simply take a listed virtual badge from the ICS 211 and move it over to an ICS 204 (a work assignment sheet). Because the virtual badge user can be ranked by qualifications, crew leaders as well as crew members are more easily created in the ICS 204. Using the same methodology, an administrator can create other ICS forms as well, again relying upon the virtual badge data transfer into the various forms. For example, by linking a red or green color to the virtual badge, the administrator easily can view which users are active as well on the scene at any given moment in time based on the color linked to that virtual badge's listing on the various forms.

With software like Virtual Badge™ and Pathfinder Eureka® system in a Command Post, split screen technology would allow a local commander to gain far broader situational awareness. For example, one screen might display a map with all of the virtual badge users in the field. A linked screen could display another map with incoming geotagged and time/date stamped field photos and forms being submitted from the virtual badge holders. Yet another screen could project thumbnail photos on the map, linked to various icons displayed on the same map, to further represent incoming field data from the Pathfinder Eureka® system. These photos or icons can be ringed with selected color codes to more easily identify the priority or level of that icon or photo, as an administrator views a collection of such icons on a map displayed in the software. Another screen could display active and inactive command personnel on an ICS 203 or ICS 207. An interactive ICS 209 "supplement," in Excel or HTML format could be on yet another screen, allowing for monitoring events as they unfold, and allowing for the quick assignment of personnel to incoming field forms coming in from one field virtual badge user or crew and then automatically assigning another virtual badge user or crew to the task of resolving the need at that same geotagged location. With a fully functioning system integrating all the technologies described herein, with or without cell and Internet service, an Incident Commander is provided with far greater awareness and accountability of all operations.

In another embodiment of the system, a scanner can be attached to the cell phone directly (or through a computer on a network synced to the phone), which scanner can scan a magnetic strip of an ID like a driver's license. In this method, the user's license information then is transferred directly into the virtual badge. This method is yet another alternative, though it may not share the pass through of the data into a local law enforcement or administrative network, which may or may not be desired. Nonetheless, this is yet another way for the virtual badge to load data and images where low security thresholds may be acceptable. In yet another embodiment of the system, a device like a simple I-Touch (manufactured by APPLE) with no cell capability may be tethered to a GPS device, if GPS is desired, and the software loaded on to this device would allow the device, which could be preloaded with specific data and images into its memory, to then scan in and out virtual badges and/or inventoried assets as described herein.

For use in the 100% disconnected environment, the Bar or QR code 516, see FIG. 21, may be scanned at a check point by a guard with a Smart phone with a camera or using NFC technology, loaded with the mobile software and system. The guard's Smart phone can pull up its own cache of data information pre-loaded by the Administrator while the guard's phone was either connected by WiFi, WiFi Mesh, Bluetooth, or cell to the system. On scanning the virtual badge in a location with no cell or Internet, the guard also can retrieve verification of the data set at 547 on FIG. 27 like a photo, logos, a name, date of birth, and/or address for the guard to verify the user matches the virtual badge as displayed on the user's phone. In this embodiment, no cell service is needed at the check point, whether the check point is in a disaster area where the infrastructure has been destroyed or in a foreign country with inadequate, incompatible cell service.

As another feature in the device, when it is in "sleep mode," the cell phone or linked device can be programmed to display in large block letters a short, user identification, such as his or her first name. The LCD screen, in its sleep mode, would have adequate back lighting to display just the basic block letters so that passer by personnel might readily identify the user and thus also authenticate that the user is in the appropriate section of the secure area.

Another advantage to this device is that when a user is finished using the device, the data and images can be wiped clean from the device, allowing the device to be used over and over by multiple users. For example as part of this method, by holding down the control button simultaneously for a pre-set amount of time, the device thoroughly would scrub and erase all data stored in its memory at 614.

All of the tracking and mapping history of the user would be integrated into the rest of the system defined within this application to allow for mapping and data assessments. With an RFID, NFC, or other chip, users also could be passively tracked without the need for check point personnel, thereby reducing monitoring costs while simultaneously increasing the precision of monitoring due to more frequent check points being implemented. With a Wi-Fi network, as an example, coupled with an area wide system of chip check points and overlays, the administrator could in fact live time track all personnel within a facility, dependent on the coverage of the entire network and system. Further, with a Mesh Wi-Fi network, such as at a disaster or on a ship, users within the network could be live tracked with the use of chip check points and overlays, even in an environment with no cell or Internet service.

Besides use at check points on bridges approaching restricted barrier island communities following a disaster, this system has a broad ability to adapt to day to day uses. College campuses could use the virtual badge for visitors or prospective applicants, who can be tracked if desired. Mass volunteer operations could make use of the device for short term events like parades or festivals. Travel or Tourism facilities could make use of the device to keep track of tourists entering or leaving a hotel or resort. Using the cell phone, NFC, or RFID tracking capability or the devices described in U.S. Pat. No. 8,154,440 or related applications, the virtual badge offers the ability to track a user throughout a network of roads and buildings spanning even the largest of bases and/or even third world countries, which likely have inadequate cell tower coverage.

All facilities and/or restricted areas would benefit from a far more accurate method of ensuring that all users actually have exited an area through an exact accounting method of tracking all exiting personnel at the end of a shift or work cycle. Even in tours of sensitive federal facilities like The White House, where visitor information is sent to a clearing facility ahead of allowing entry, said data and information could be fed through the system into the cell phones and/or devices. Once activated on the day of the individual arriving for the tour, the cell phone and/or linked device can be worn on a lanyard, allowing for easy identification of the virtual badge holder. Further, with the RFID, NFC, or other chip, remote monitors could live track all virtual badges if so desired, or at the least, monitor all badges to make sure every user safely exits the secure area. When the user returns the badge upon exiting, the linked device can be wiped clean and then re-used again.

Consistent with the rest of this mobile software application, a user with an approved virtual badge on his device or cell phone, may have the device's history mapped and tracked via the GPS based, mobile application for minutes, hours and/or days, subject to the Administrator's setting. This method of tracking allows for yet another business method of charging for the virtual badge's tracking during usage by charging by the minute, just as cell phone usage is normally charged. Related to this option and if selected by an administrator as an option, a guard at a check point could turn on the tracking of the user's device via manual or electronic means at the check point for the period when the user is within the restricted area. If the user departs from the restricted area, the guard or Administrator may be alerted and/or the time, location, and the time at the location can be stored for future retrieval. As part of proper exit protocol, i.e. when the individual is no longer in the known restricted area, the guard or administrator could deactivate the tracking software in the same manner it was activated on entry. Using this option for a group of users with badges within the restricted area thus allows, for example, for law enforcement to examine all the users' track histories if there were a burglary within the restricted area to help establish which user may have been near the GPS location of the burglary at the time of the intrusion.

While the system can be designed to not let the virtual badge user deactivate the virtual badge while in such a zone, the user might disable the virtual badge by simply turning off the phone or the phone or device's battery might go dead. The system could note the time and date of such a deactivation, and either alert an administrator, or log the time, date, and last known coordinates of that virtual badge. With connectivity, the users could be live tracked on base maps or from a supervisor's smart phone with the application while the virtual badge users were within the restricted area. Even within areas where there are not cell towers resulting in a completely disconnected environment, the device with the virtual badge could be tracked using the methods described in the rest of this software application and its earlier versions.

The present invention also involves a method that allows for the primary functions of the core mobile and/or desktop software application to be easily adapted for a multitude of uses, including but not limited to: social networking, business fleet-tracking/management, disaster response, post-disaster recovery, mitigation, preparedness, and insurance claims. This technical process is accomplished by adding or subtracting plugin-modules from the code base so as to develop FEMA's Whole Community mentality for responding to disasters by users utilizing the mobile application as a part of their normal daily routine. By using the GPS based cell phone application on a regular daily basis for fun or for business, when an emergency occurs, all of the users are already adept at using the application, rather than needing some new training or refresher to recall how to use the application. The switch from normal daily use to a use designed to immediately upload numerous Situational Awareness reports from the Whole Community re-emphasizes the capacity of using non-governmental responders as force multipliers during a disaster. This collection of technical processes enables the same source code to be customized to fit a multitude of needs. This plug-in module design allows for maximum flexibility in adjusting designs to fit the Whole Community, whether for business, school, friends, family, church, or any other applicable group.

In any of the embodiments described herein, the system of identifying individuals using a virtual badge can further be adapted to include individuals who do not have access to an electronic display unit. Accordingly, users that have a virtual badge based on an electronic profile electronically linked to and/or displayed on an electronic display unit can be associated with a sub-group of individuals or users that do not have access to an electronic display unit. For those individuals that do not have an electronic display unit, a virtual badge may be created for each individual sub-group user and then electronically linked to an individual that has an electronic display unit. The individual with access to the electronic display unit may therefore contain multiple virtual badge displays, one for his/her own profile and one or more for the sub-group users. The following is an illustrative example of a method of identifying an individual using an electronic identification system utilizing a virtual badge which includes users with and without access to an electronic display. The method includes the one or more of the following steps: establishing a customizable set of data to be included in an electronic identification system database for identifying one or more individuals from a user group using a virtual badge; identifying at least one individual that requires electronic identification using said virtual badge; providing an electronic profile for said individual; creating a virtual badge based on said electronic profile; said virtual badge having information, images, indicia, or combinations thereof which identify said individual; providing each said individual access to said virtual badge; downloading said user's virtual badge to a first electronic display device; providing a sub-group of users, said sub-group of users defined by one or more users who do not have access to an electronic display device; creating an electronic profile for said at least one sub-group user; creating a virtual badge based on said electronic profile for each said sub-group of user, and associating said sub-group user virtual badge with at least one said individual requiring an electronic identification using said virtual badge. Additional features, steps or functionality as described throughout the specification, such as but not limited to using a second display unit, creating a map overlay, tracking the virtual badge, may also form part of the method just described.

The virtual badge system, method, and device may also be adapted to use one or more biometric techniques and/or one or more biometric data to identify virtual badge user individuals based on one or more unique physical characteristics or traits, including but not limited to eye spectrographs, fingerprint identification, facial recognition, retina identification, vein pattern recognition, signature recognition, or voice recognition. The virtual badge system, method, and device may be adapted to include having the electronic display unit comprise the necessary hardware and/or softer to capture data, such as images, as well as process the information received. For example, the electronic display unit described herein may include the necessary hardware to capture or scan a fingerprint or retina. In addition to, or alternatively, the electronic display unit includes the necessary software to process such information and/or electronically deliver such information to an independent individual or administrator. Alternatively, as part of the data or images displayed as part of the virtual badge, the electronic display device may include images of the user's biometric data, such as a fingerprint, retina scan, voice pattern, in addition to the user's photo and address.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of controlling access within an area using an electronic identification system utilizing a virtual badge comprising:
   providing an administrative entity for establishing a customizable set of data to be included in an electronic identification system database for identifying one or more individuals from a user group using a virtual badge;
   identifying at least one individual that requires electronic identification using said virtual badge;
   providing an electronic profile for said individual;
   creating a virtual badge which is displayable on a display device based on said electronic profile; said virtual badge having information, images, indicia, or combinations thereof which identify said individual;
   associating a self-destruct mechanism to said virtual badge to render said virtual badge unusable after a prescribed time period or upon command from said administrative entity;
   said administrative entity providing each said individual access to said virtual badge; and
   transferring said virtual badge from said administrative entity to a first electronic display device.

2. The method of controlling access within an area using an electronic identification system utilizing a virtual badge according to claim 1 further including the step of displaying said virtual badge on a first display device.

3. The method of controlling access within an area using an electronic identification system utilizing a virtual badge according to claim 2 further including the step of linking said virtual badge image displayed on said first display device to a second display device.

4. The method of controlling access within an area using an electronic identification system utilizing a virtual badge according to claim 1 wherein said first electronic display unit is adapted for GPS positioning functionality.

5. The method of controlling access within an area using an electronic identification system utilizing a virtual badge according to claim 4 further including the step of mapping, tracking, or combinations thereof, said virtual badge transferred to said first display device.

6. The method of controlling access within an area using an electronic identification system utilizing a virtual badge according to claim 4 wherein said virtual badge is tracked using RFID or NFC.

7. The method of controlling access within an area using an electronic identification system utilizing a virtual badge according to claim 6 wherein said location of said virtual badge is displayed on a map.

8. The method of controlling access within an area using an electronic identification system utilizing a virtual badge according to claim 4 further including the step of determining at least one location of said virtual badge; and storing said location within said first electronic display device.

9. The method of controlling access within an area using an electronic identification system utilizing a virtual badge according to claim 8 wherein said data received by said first display device is transferred to at least one data storage device controlled by said administrator.

10. The method of controlling access within an area using an electronic identification system utilizing a virtual badge according to claim 1 wherein said virtual badge includes a photo of said individual, data, a pictorial image, text, optical machine readable representations of data, or combinations thereof.

11. The method of controlling access within an area using an electronic identification system utilizing a virtual badge according to claim 1 wherein said access to said virtual badge is through a web based portal, a laptop, a server, or combinations thereof.

12. The method of controlling access within an area using an electronic identification system utilizing a virtual badge according to claim 1 further including the step of associating a color stripe, a watermark, images, background, or combinations thereof into said virtual badge.

13. The method of controlling access within an area using an electronic identification system utilizing a virtual badge according to claim 12 wherein said color stripe or background is programmed to change to a second color after a prescribed time period.

14. The method of controlling access within an area using an electronic identification system utilizing a virtual badge according to claim 1 further including the step of determining a location of said virtual badge; and transmitting said location to a display unit controlled by an administrator or user of said system.

15. The method of controlling access within an area using an electronic identification system utilizing a virtual badge according to claim 1 wherein said virtual badge or said display unit is adapted to use at least one biometric technique, biometric data, or combinations thereof.

16. The method of controlling access within an area using an electronic identification system utilizing a virtual badge according to claim 1 further including the step of determining if said individual is eligible to use said virtual badge.

17. The method of controlling access within an area using an electronic identification system utilizing a virtual badge according to claim 16 wherein said determination step includes determining if said individual has been charged or convicted of a crime, reviewing said user's financial history, or combinations thereof.

18. The method of controlling access within an area using an electronic identification system utilizing a virtual badge according to claim 1 further including the steps of:
- providing a sub-group of users, said sub-group of users defined by one or more users who do not have access to an electronic display device;
- creating an electronic profile for said one or more sub-group user;
- creating a virtual badge based on said electronic profile for each said sub-group of user, and
- associating said sub-group user virtual badge with at least one said individual requiring an electronic identification using said virtual badge.

19. The method of controlling access within an area using an electronic identification system utilizing a virtual badge according to claim 1 wherein said virtual badge is adapted to include a clock in or clock out functionality.

\* \* \* \* \*